(12) United States Patent
Tanimura et al.

(10) Patent No.: US 6,365,655 B1
(45) Date of Patent: Apr. 2, 2002

(54) PROCESS FOR STABILIZING OXYMETHYLENE COPOLYMER

(75) Inventors: Noritaka Tanimura, Kurashiki; Hajime Nagahara, Tokyo; Tadashi Tanaka, Kurashiki; Satoru Ohtsuki, Nobeoka, all of (JP)

(73) Assignee: Asahi Kasei Kogyo Kabushiki Kaisha, Osaka (JP)

( * ) Notice: Subject to any disclaimer, the term of this patent is extended or adjusted under 35 U.S.C. 154(b) by 0 days.

(21) Appl. No.: 09/367,288

(22) PCT Filed: Mar. 26, 1998

(86) PCT No.: PCT/JP98/01368

§ 371 Date: Aug. 16, 1999

§ 102(e) Date: Aug. 16, 1999

(87) PCT Pub. No.: WO98/42781

PCT Pub. Date: Oct. 1, 1998

(30) Foreign Application Priority Data

Mar. 26, 1997 (JP) ............................................... 9-073595

(51) Int. Cl.$^7$ ................................................. C08K 5/17
(52) U.S. Cl. ....................................... 524/236; 524/251
(58) Field of Search .................................. 524/236, 251

(56) References Cited

U.S. PATENT DOCUMENTS

| | | |
|---|---|---|
| 3,337,504 A | 8/1967 | Fisher et al. |
| 3,418,280 A | 12/1968 | Orgen et al. |
| 4,366,305 A | 12/1982 | Amemiya et al. |
| 5,288,864 A * | 2/1994 | Nichols et al. ............. 544/193 |

FOREIGN PATENT DOCUMENTS

| | | |
|---|---|---|
| EP | 0088541 A2 | 9/1983 |
| JP | 398071 | 5/1964 |
| JP | 4010435 | 5/1965 |
| JP | 4011627 | 6/1965 |
| JP | 431875 | 1/1968 |
| JP | 59159812 A | 10/1984 |
| JP | 60-63216 | 4/1985 |
| JP | 62129311 A | 11/1987 |
| JP | 63-27519 | 2/1988 |
| JP | 01-153711 | 6/1989 |

* cited by examiner

Primary Examiner—Edward J. Cain
(74) Attorney, Agent, or Firm—Birch, Stewart, Kolasch & Birch, LLP

(57) ABSTRACT

Disclosed is a method for stabilizing a crude oxy-methylene copolymer having thermally unstable terminal groups, which comprises subjecting a crude oxymethylene copolymer to heat treatment in the presence of at least one quaternary ammonium compound represented by the following formula (1):

$$[R^1R^2R^3R^4N^+]_n X^{-n} \qquad (1)$$

wherein each of $R^1$, $R^2$, $R^3$ and $R^4$ independently represents an unsubstituted or substituted alkyl group, an aryl group, an aralkyl group which is an unsubstituted or substituted alkyl group substituted with at least one aryl group, or an alkylaryl group which is an aryl group substituted with at least one unsubstituted or substituted alkyl group; n is an integer of from 1 to 3; and X is a hydroxyl group or an acid residue. In this method, even by the addition of a very small amount of the quaternary ammonium compound, the decomposition rate of the unstable terminal groups can be remarkably increased, thereby facilitating the stabilization of the crude copolymer. Therefore, by this method, it has become possible to easily produce an excellent oxymethylene copolymer within a short period of time, which has substantially no unstable terminal groups and, therefore, has excellent thermal stability and color tone.

22 Claims, No Drawings

PROCESS FOR STABILIZING OXYMETHYLENE COPOLYMER

This application is the national phase under 35 U.S.C. §371 of PCT International Application No. PCT/JP98/01368 which has an International filing date of Mar. 26, 1998 which designated the United States of America.

FIELD OF THE INVENTION

The present invention relates to a method for stabilizing an oxymethylene copolymer having unstable terminal groups (such an oxymethylene copolymer which is hereinafter, frequently referred to simply as a "crude oxymethylene copolymer") and a stabilizer reagent for use in stabilizing such a crude oxymethylene copolymer. More particularly, the present invention is concerned with a method for stabilizing a crude oxymethylene copolymer, which comprises subjecting a crude oxymethylene copolymer to heat treatment in the presence of a specific quaternary ammonium compound, and is also concerned with a stabilizer reagent for use in stabilizing a crude oxymethylene copolymer by heat treatment, which mainly comprises the above-mentioned specific quaternary ammonium compound. In the method of the present invention, even by the addition of a very small amount of the quaternary ammonium compound, the decomposition rate of the unstable terminal groups of the crude oxymethylene copolymer can be remarkably increased, thereby facilitating the stabilization of the crude oxymethylene copolymer. Therefore, by the method of the present invention, it has become possible to easily produce an excellent oxymethylene copolymer within a short period of time, which has substantially no unstable terminal groups and, therefore, is excellent with respect to both thermal stability and color tone. Further, the stabilizer reagent of the present invention, when used in the above-mentioned heat treatment, can remarkably increase the decomposition rate of the unstable terminal groups of the crude oxymethylene copolymer, thereby facilitating the stabilization of the crude oxymethylene copolymer.

BACKGROUND OF THE INVENTION

Conventionally, oxymethylene copolymers have been widely used as materials for automobile parts, electronic parts, electrical parts, etc., since the oxymethylene copolymers have not only a good balance of mechanical properties, but also excellent fatigue resistance properties. The oxymethylene copolymer is produced by copolymerizing formaldehyde or a cyclic acetal (such as trioxane which is a cyclic trimer of formaldehyde) with a cyclic ether and/or a cyclic formal. However, the thus obtained oxymethylene copolymer as such cannot be put into practical use for the following reason. With respect to such an oxymethylene copolymer, some of the copolymer chains thereof have terminal $—(OCH_2)_n—OH$ groups. The above-mentioned terminal groups are thermally unstable and, hence, easily decompose by, for example, heating at the time of the molding of the oxymethylene copolymer, thereby generating a large amount of formaldehyde. The generation of a large amount of formaldehyde is disadvantageous, since the oxymethylene copolymer is likely to suffer from foaming during the molding thereof and traces of escape of gaseous formaldehyde are left in the surface of the resultant shaped article to thereby cause the surface appearance to be poor. Further, the generated formaldehyde is oxidized by oxygen present in the molding machine to thereby form formic acid, and the formic acid by-product promotes the decomposition of the main chain of the oxymethylene copolymer.

Conventional methods for stabilizing an oxymethylene copolymer having thermally unstable terminal $—(OCH_2)_n—OH$ groups (i.e., crude oxymethylene copolymer) include a method in which the terminal groups of the crude copolymer are acetylated, etherified or urethanized, and a method in which the unstable terminal groups of the crude copolymer are decomposed. Of these methods, the method in which the unstable terminal groups are decomposed is advantageously used for stabilizing the crude oxymethylene copolymer. Specific known methods for decomposing the unstable terminal groups of the crude oxymethylene copolymer include a method in which the crude oxymethylene copolymer is heated in water or an organic solvent (optionally, in the presence of a basic substance capable of decomposing the unstable terminal groups) (heat treatment method using water or an organic solvent), and a method in which the stabilization of a crude oxymethylene copolymer is conducted by heat-melting the copolymer (melt method). The heat treatment method using water or an organic solvent requires various steps, such as the steps of separation (filtration), recovery and washing of the treated copolymer, whereas, the melt method is commercially advantageous, since a stabilized copolymer can be directly obtained.

As an example of a conventionally known heat treatment method using water or an organic solvent, there is a method in which a crude oxymethylene copolymer is subjected to heat treatment in a medium (for example, water, or a mixture of water and methanol) which is incapable of completely dissolving therein the crude oxymethylene copolymer (that is, the heat treatment of the copolymer is conducted in a heterogenous system) to thereby decompose the unstable terminal units of the copolymer {see, for example Examined Japanese Patent Application Publication No. 40-10435 and Examined Japanese Patent Application Publication No. 43-7553 (corresponding to U.S. Pat. No. 3,337,504) }However, in this method, the heat treatment needs to be conducted at a temperature near the melting point of the oxymethylene copolymer in order to increase the decomposition rate of the unstable terminal groups. In addition, heat treatment needs to be conducted for a long period of time in order to decompose the unstable terminal groups as much as possible. In this method, even by the heat treatment under the above-mentioned stringent conditions, the decomposition of the unstable terminal groups is unsatisfactory. Further, this method also has a problem in that the obtained oxymethylene copolymer is likely to suffer discoloration due to the heat treatment conducted at a high temperature for a long period time. Examined Japanese Patent Application Publication No. 40-11627 discloses a method in which a crude oxymethylene copolymer is exposed to a saturated vapor mixture (formed from a volatile organic solvent, a volatile base and water) at 100° C. or more under atmospheric or higher pressure, thereby decomposing the unstable terminal groups of the copolymer. However, also in this method, the decomposition of unstable terminal groups is unsatisfactory.

With respect to the conventionally known melt methods in which a crude oxymethylene copolymer is heated to thereby melt the copolymer, and the unstable terminal groups of the copolymer are decomposed while maintaining the copolymer in a molten state. For example, Examined Japanese Patent Application Publication No. 39-8071 discloses a method in which a molten copolymer is kneaded using a roll mill for a predetermined period of time; Examined Japanese Patent Application Publication No. 43-1875 and Examined Japanese Patent Application Publication No.44-11907 (corresponding to U.S. Pat. No. 3,418,280) disclose a method in which a crude oxymethylene copolymer is heat-melted in an extruder in the presence of water and an alcohol, and optionally an alkaline substance; Examined Japanese Patent Application Publication No. 58-11450 (corresponding to U.S. Pat. No. 4,366,305) discloses a method in which the decomposition of the unstable terminal groups of a crude oxymethylene copolymer is conducted by treating the crude oxymethylene copolymer in a molten form under reduced pressure using a special surface-renewing mixer; Unexamined Japanese Patent Application Laid-Open Specification No. 58-152012 (corresponding to European Patent No. 0 088 541) discloses a method in which the stabilization of a crude oxymethylene copolymer is conducted using a system comprising a single screw extruder for melting a crude oxymethylene copolymer, a static mixer having a reaction zone for decomposing the unstable terminal groups of the crude copolymer by mixing, in accordance with the principle of flow division and rearrangement, the crude copolymer and a reactant comprising water and a compound capable of producing a hydroxide in the presence of water, and a vented screw extruder for removing volatile side products, which is directly connected to the static mixer; and Unexamined Japanese Patent Application Laid-Open Specification No. 62-129311 discloses a method in which a crude oxymethylene copolymer in the form of a powder or granules are treated at a temperature which is 5 to 35° C. lower than the melting point of the crude copolymer and under a reduced pressure, followed by heat-melt treatment in an extruder. By these melt methods, it is possible to obtain a stabilized oxymethylene copolymer which can be put-into practical use; however, such a stabilized oxymethylene copolymer still has thermally unstable terminal groups which are likely to cause unfavorable phenomena, such as the occurrence of mold deposits, during molding. Therefore, an oxymethylene copolymer having an improved stability has been strongly desired.

In the above-mentioned conventional methods, for improving the decomposition rate of unstable terminal groups, it is necessary to use an additive, such as the above-mentioned basic substance, alkaline material or compound capable of producing a hydroxide in the presence of water (for example, an amine is frequently used as such an additive) to a crude oxymethylene copolymer in an increased amount. However, when an additive, such as an amine, is added to the copolymer in too large an amount, discoloration of the copolymer occurs. In addition, the treatment must be conducted for a long period of time or repeated several times in order to reduce the unstable terminal group content of the copolymer to a satisfactory level. The treatment under such stringent conditions are disadvantageous not only in that discoloration of the copolymer occurs even without using a large amount of the above-mentioned additive, but also in that a large scale and complicated apparatus is needed. Further, as mentioned above, the conventional methods also have a problem in that the decomposition of unstable terminal groups of a crude oxymethylene copolymer is unsatisfactory. Therefore, it has been strongly desired to develop a method for efficiently producing an oxymethylene copolymer having a very small amount of unstable terminal groups.

SUMMARY OF THE INVENTION

In this situation, the present inventors have made extensive and intensive studies with a view toward developing a method for stabilizing an oxymethylene copolymer which enables the efficient production of an oxymethylene copolymer having excellent thermal stability and color tone, and a stabilizer reagent which can be advantageously used in such a method. As a result, it has unexpectedly been found that, when the heat treatment of a crude oxymethylene copolymer is conducted in the presence of a specific quaternary ammonium compound, it becomes possible not only to effectively stabilize the thermally unstable terminal groups of the oxymethylene copolymer to a remarkably high level, but also to solve the above-mentioned various problems accompanying the conventional stabilization methods. The present invention has been completed, based on this novel finding.

Accordingly, it is a primary object of the present invention to provide a method for stabilizing a crude oxymethylene copolymer, thereby making it possible to easily produce an oxymethylene copolymer having excellent thermal stability and color tone within a short period of time.

It is another object of the present invention to provide a stabilizer reagent for use in the above-mentioned method, which is capable of remarkably increasing the decomposition rate of the unstable terminal groups of a crude oxymethylene copolymer to thereby facilitate the stabilization of the copolymer.

The foregoing and other objects, features and advantages of the present invention will be apparent to those skilled in the art from the following detailed description and appended claims.

Hereinbelow, the present invention will be described in more detail.

DETAILED DESCRIPTION OF THE INVENTION

In one aspect of the present invention, there is provided a method for stabilizing an oxymethylene copolymer having thermally unstable terminal groups, which comprises subjecting an oxymethylene copolymer having thermally unstable terminal groups to heat treatment in the presence of at least one quaternary ammonium compound represented by the following formula (1):

   (1)

wherein:
  each of $R^1$, $R^2$, $R^3$ and $R^4$ independently represents an unsubstituted or substituted $C_1$–$C_{30}$ alkyl group, a $C_6$–$C_{20}$ aryl group, an aralkyl group which is an unsubstituted or substituted $C_1$–$C_{30}$ alkyl group substituted with at least one $C_6$–$C_{20}$ aryl group, or an alkylaryl group which is a $C_6$–$C_{20}$ aryl group substituted with at least one unsubstituted or substituted $C_1$–$C_{30}$ alkyl group, wherein the unsubstituted or substituted alkyl group is linear, branched or cyclic, and the substituted alkyl group has at least one substituent selected from the group consisting of a halogen atom, a hydroxyl group, an aldehyde group, a carboxyl group, an amino group and an amide group, and wherein at least one hydrogen atom of each of the unsubstituted alkyl group, the aryl group, the aralkyl group and the alkylaryl group is optionally replaced by a halogen atom;
  n represents an integer of from 1 to 3; and
  X represents a hydroxyl group, or an acid residue of a $C_1$–$C_{20}$ carboxylic acid, a hydroacid, an oxoacid, an inorganic thioacid or a $C_1$–$C_{20}$ organic thioacid.

For easy understanding of the present invention, the features and various embodiments of the present invention is enumerated below.
1. A method for stabilizing an oxymethylene copolymer having thermally unstable terminal groups which comprises subjecting an oxymethylene copolymer having thermally unstable terminal groups to heat treatment in the presence of at least one quaternary ammonium compound represented by the following formula (1):

$$[R^1R^2R^3R^4N^+]_n X^{-n} \quad (1)$$

wherein:
  each of $R^1$, $R^2$, $R^3$ and $R^4$ independently represents an unsubstituted or substituted $C_1$–$C_{30}$ alkyl group, a $C_6$–$C_{20}$ aryl group, an aralkyl group which is an unsubstituted or substituted $C_1$–$C_{30}$ alkyl group substituted with at least one $C_6$–$C_{20}$ aryl group, or an alkylaryl group which is a $C_6$–$C_{20}$ aryl group substituted with at least one unsubstituted or substituted $C_1$–$C_{30}$ alkyl group, wherein the unsubstituted or substituted alkyl group is linear, branched or cyclic, and the substituted alkyl group has at least one substituent selected from the group consisting of a halogen atom, a hydroxyl group, an aldehyde group, a carboxyl group, an amino group and an amide group, and wherein at least one hydrogen atom of each of the unsubstituted alkyl group, the aryl group, the aralkyl group and the alkylaryl group is optionally replaced by a halogen atom;
  n represents an integer of from 1 to 3; and
  X represents a hydroxyl group, or an acid residue of a $C_1$–$C_{20}$ carboxylic acid, a hydroacid, an oxoacid, an inorganic thioacid or a $C_1$–$C_{20}$ organic-thioacid.

2. The method according to item 1 above, wherein the heat treatment of the oxymethylene copolymer is performed at a temperature in the range of from the melting temperature of the oxymethylene copolymer to 260° C. wherein the oxymethylene copolymer is in a molten state.

3. The method according to item 2 above, wherein the quaternary ammonium compound is added to the oxymethylene copolymer prior to melting the oxymethylene copolymer.

4. The method according to item 2 above, wherein the quaternary ammonium compound is added to the oxymethylene copolymer after melting the oxymethylene copolymer.

5. The method according to any one of items 2 to 4 above, wherein the quaternary ammonium compound is used in an amount of from 0.05 to 50 ppm by weight in terms of the amount of the nitrogen ascribed to the quaternary ammonium compound, relative to the total weight of the oxymethylene copolymer and the quaternary ammonium compound, wherein the amount of the nitrogen is represented by the following formula (2):

$$P \times 14/Q \quad (2)$$

wherein P represents the amount (ppm by weight) of the quaternary ammonium compound, relative to the total weight of the oxymethylene copolymer and the quaternary ammonium compound, 14 is the atomic weight of nitrogen, and Q represents the molecular weight of the quaternary ammonium compound.

6. The method according to any one of items 2 to 5 above, wherein the quaternary ammonium compound is used in the form of a solution of the quaternary ammonium compound in at least one solvent selected from the group consisting of water and an organic solvent capable of dissolving the quaternary ammonium compound.

7. The method according to item 1 above, wherein the heat treatment of the oxymethylene copolymer is performed at a temperature in the range of from 80° C. to lower than the melting temperature of the oxymethylene copolymer and wherein the oxymethylene copolymer is in the form of a slurry obtained by-mixing the oxymethylene copolymer in a non-molten state with a solution of the quaternary ammonium compound in a medium incapable of completely dissolving the oxymethylene copolymer.

8. The method according to item 7 above, wherein the concentration of the quaternary ammonium compound in the solution is in the range of from 0.05 to 500 ppm by weight in terms of the concentration of the nitrogen ascribed to the quaternary ammonium compound in the solution, wherein the concentration of the nitrogen is represented by the formula (2'):

$$P' \times 14/Q \quad (2')$$

wherein P' represents the concentration (ppm by weight) of the quaternary ammonium compound in the solution, 14 is the atomic weight of nitrogen, and Q represents the molecular weight of the quaternary ammonium compound.

9. The method according to any one of items 1 to 8 above, wherein the oxymethylene copolymer is obtained by copolymerizing formaldehyde or a cyclic acetal with at least one member selected from the group consisting of a cyclic ether and a cyclic formal in the presence of a polymerization catalyst.

10. The method according to item 9 above, wherein the cyclic acetal is trioxane and the cyclic formal is 1,3-dioxolane.

11. The method according to item 9 or 10 above, wherein the polymerization catalyst is a cation-active polymerization catalyst.

12. The method according to any one of items 9 to 11 above, which further comprises deactivating said polymerization catalyst, wherein the heat treatment of the oxymethylene copolymer is performed after the deactivation of the polymerization catalyst.

13. The method according to any one of items 9 to 11 above, wherein the heat treatment of the oxymethylene copolymer is performed without deactivating the polymerization catalyst.

14. The method according to any one of items 1 to 13 above, wherein X in the formula (1) represents the acid residue of a carboxylic acid.

15. The method according to item 14 above, wherein the carboxylic acid is at least one acid selected from the group consisting of formic acid, acetic acid and propionic acid.

16. The method according to any one of items 1 to 15 above, wherein each of $R^1$, $R^2$, $R^3$ and $R^4$ in the formula (1) independently represents a $C_1$–$C_5$ alkyl group or a $C_2$–$C_4$ hydroxyalkyl.

17. The method according to item 16 above, wherein at least one of $R^1$, $R^2$, $R^3$ and $R^4$ in the formula (1) is a hydroxyethyl group.

18. A stabilizer reagent for use in stabilizing an oxymethylene copolymer having thermally unstable terminal groups, mainly comprising at least one quaternary ammonium compound represented by the following formula (1):

$$[R^1R^2R^3R^4N^+]_n X^{-n} \quad (1)$$

wherein:
  each of $R^1$, $R^2$, $R^3$ and $R^4$ independently represents an unsubstituted or substituted $C_1$–$C_{30}$ alkyl group, a $C_6$–$C_{20}$ aryl group, an aralkyl group which is an unsubstituted or substituted $C_1$–$C_{30}$ alkyl group substituted with at least one $C_6$–$C_{20}$ aryl group, or an alkylaryl group which is a $C_6$–$C_{20}$ aryl group substituted with at least one unsubstituted or substituted $C_1$–$C_{30}$ alkyl group, wherein the unsubstituted or substituted alkyl group is linear, branched or cyclic, and the substituted alkyl group has at least one substituent selected from the group consisting of a halogen atom, a hydroxyl group, an aldehyde group, a carboxyl group, an amino group and an amide group, and wherein at least one hydrogen atom of each of the unsubstituted alkyl group, the aryl group, the aralkyl group and the alkylaryl group is optionally replaced by a halogen atom;

n represents an integer of from 1 to 3; and

X represents a hydroxyl group, or an acid residue of a $C_1$–$C_{20}$ carboxylic acid, a hydroacid, an oxoacid, an inorganic thioacid or a $C_1$–$C_{20}$ organic thioacid.

19. The reagent according to item 18 above, wherein X in the formula (1) represents the acid residue of a carboxylic acid.

20. The reagent according to item 19 above, wherein the carboxylic acid is at least one acid selected from the group consisting of formic acid, acetic acid and propionic acid.

21. The reagent according to any one of items 18 to 20 above, wherein each of $R^1$, $R^2$, $R^3$ and $R^4$ in the formula (1) independently represents a $C_1$–$C_5$ alkyl group or a $C_2$–$C_4$ hydroxyalkyl.

22. The reagent according to item 21 above, wherein at least one of the $R^1$, $R^2$, $R^3$ and $R^4$ in the formula (1) is a hydroxyethyl group.

As explained in detail below, in the present invention, the term "oxymethylene copolymer having thermally unstable terminal groups" means an oxymethylene copolymer in which some of the copolymer chains have terminal —$(OCH_2)_n$—OH (wherein n represents a positive integer) groups (i.e., a crude oxymethylene copolymer). Such a crude oxymethylene copolymer is easily decomposed by, for example, heating, thereby generating formaldehyde.

A method for conducting the decomposition of unstable terminal groups in the presence of, for example, ammonia; an aliphatic amine compound, such as triethylamine, tri-n-butylamine and triethanolamine; or a hydroxide, an inorganic weak acid salt or an organic acid salt of an alkali metal or an alkaline earth metal, has been conventionally known. However, none of the conventional methods teach or suggest the decomposition of unstable terminal groups in the presence of a quaternary ammonium compound, and it is surprising that the decomposition rate of the unstable terminal groups of the crude oxymethane copolymer can be remarkably increased when the crude oxymethylene copolymer is heat-treated in the presence of a quaternary ammonium compound. Further, when the substance, which has been conventionally used for the decomposition of unstable terminal groups such as mentioned above, is used in a large amount in an attempt to increase the decomposition rate, discoloration of the resultant oxymethylene copolymer is likely to occur, so that the amount of the above-mentioned conventionally used substance is limited to a level wherein the decomposition of the unstable terminal groups cannot be satisfactorily effected. On the other hand, with respect to the quaternary ammonium compound used in the method of the present invention, even by the addition of a very small amount of the quaternary ammonium compound, the decomposition rate of the unstable terminal groups is remarkably increased. Therefore, the method of the present invention is free from the problems accompanying the conventional method, such as the discoloration of oxymethylene copolymer and other unfavorable effects caused by the above-mentioned substance conventionally used for the decomposition of unstable terminal groups which substance remains in the copolymer. By the method of the present invention, an excellent oxymethylene copolymer which has substantially no unstable terminal groups and, therefore, has excellent thermal stability and color tone is easily produced within a short period of time.

An explanation is made below with respect to the type of the crude oxymethylene copolymer to be used in the method of the present invention.

There is no particular limitation to the type of the crude oxymethylene copolymer used in the method of the present invention and any oxymethylene copolymers produced by conventional polymerization methods can be used. For example, use can be made of an oxymethylene copolymer containing an oxyalkylene unit (having at least 2 carbon atoms) in its main chain, which is produced by copolymerizing formaldehyde or a cyclic acetal, such as trioxane (a cyclic trimer of formaldehyde), with a comonomer polymerizable therewith, such as a cyclic ether or a cyclic formal, in the presence of a known polymerization catalyst. Further, the crude oxymethylene copolymer which is a multi-comonomer copolymer obtained by polymerizing a multicomponent monomer mixture containing a mono- or di-glycidyl compound and the like, and a copolymer having a branched or a crosslinked structure can be used. In the method of the present invention, a copolymer obtained by reacting an oxymethylene homopolymer with a comonomer in the presence of a cationic polymerization catalyst can also be used.

With respect to the manner of the polymerization reaction for producing a crude oxymethylene copolymer, there is no particular limitation, and for example, the polymerization reaction can be performed by bulk polymerization. The bulk polymerization may be conducted in either a batchwise or a continuous manner. In general, such a bulk polymerization is conducted using monomers in a molten state, to thereby obtain a solid copolymer in a bulk form as the polymerization proceeds.

Preferred examples of comonomers for producing a crude oxymethylene copolymer used in the method of the present invention include monomers represented by the following formula (3):

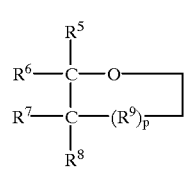
(3)

wherein each of $R^5$ to $R^6$ independently represents a hydrogen atom, a $C_1$–$C_5$ alkyl group which is unsubstituted or substituted with 1 to 3 halogen atoms, and each $R^9$ independently represents a methylene or oxymethylene group, which is unsubstituted or substituted with 1 or 2 $C_1$–$C_5$ alkyl groups or 1 or 2 halogen atoms (in this case, p represents an integer of from 0 to 3), or $R^9$ independently represents a bivalent group represented by formula (4) or (5):

$$—(CH_2)_q—O—CH_2— \qquad (4)$$

$$—(OCH_2CH_2)_q—O—CH_2— \qquad (5)$$

{in this case, p in formula (3) is 1, and q in formula (4) or (5) represents an integer of from 1 to 4}.

Representative examples of comonomers represented by formula (3) above include ethylene oxide, propylene oxide, 1,3-dioxolane, 1,3,5-trioxepane, 1,4-butanediol formal, epichlorohydrin and diglycol formal. Of these, a cyclic formal, such as 1,3-dioxolane, 1,3,5-trioxepane or 1,4-butanediol formal, is preferred as a comonomer for producing the crude oxymethylene copolymer used in the method of the present invention. 1,3-Dioxolane and 1,4-butanediol formal are especially preferred. A comonomer is used in an amount of from 0.02 to 15 mol %, preferably from 0.1 to 10 mol %, based on the amount of the trioxane.

With respect to the polymerization catalysts which are used for producing the crude oxymethylene copolymer, cation-active polymerization catalysts, such as Lewis acids, and protonic acids and esters and anhydrides thereof are preferred. Examples of Lewis acids include halides of boric acid, tin, titanium, phosphorous, arsenic and antimony. Specific examples of Lewis acids include boron trifluoride, tin tetrachloride, titanium tetrachloride, phosphorus pentafluoride, phosphorus pentachloride, antimony pentafluoride and complexes or salts thereof. Examples of protonic acids and esters and anhydrides thereof include perchloric acid, trifluoromethanesulfonic acid, tert-butyl perchlorate, acetyl perchlorate, and trimethyloxonium hexafluorophosphate. Of the above cation-active polymerization catalysts, boron trifluoride, boron trifluoride hydrate, and coordination compounds of an oxygen- or sulfur- containing organic compound with boron trifluoride, specifically, boron trifluoride diethyl ether and boron trifluoride di-n-butyl ether, are especially preferred. With respect to the amount of the polymerization catalyst, the catalyst is generally used in an amount of from $1 \times 10^{-6}$ to $1 \times 10^{-3}$ mol, preferably $5 \times 10^{-6}$ to $1 \times 10^{-4}$ mol per mol of the total of the trioxane and cyclic ether.

An explanation is made below with respect to the terminal groups of oxymethylene copolymer chains of the crude oxymethylene copolymer used in the method of the present invention.

In the present invention, the copolymer chains of the crude oxymethylene copolymer (which is subjected to terminal stabilization treatment) collectively have, as terminal groups, alkoxy groups, such as a methoxy group ($-OCH_3$), hydroxyalkyl groups, such as a hydroxyethyl group ($-CH_2CH_2OH$), and formate groups.

The terminal alkoxy groups having at least one carbon atom are derived from a formal which is used as a molecular weight modifier in the copolymerization. For example, methylal $[(CH_3O)_2CH_2]$ is generally used as the molecular weight modifier. In this case, methoxy groups are formed as terminal groups. There is no particular limitation to the number of carbon atoms of the terminal alkoxy group, but from the view point of the synthesis and purification of the formal used as the molecular weight modifier, the terminal alkoxy group generally has 1 to 10 carbon atoms, preferably 1 to 3 carbon atoms.

The terminal hydroxyalkyl groups, such as the hydroxyethyl group and the hydroxybutyl group, are derived from the above-mentioned cyclic ether or cyclic formal which is used as a raw material comonomer, and such terminal groups are formed in the following manner. The terminal hydroxymethyl groups ($-CH_2OH$) are formed during the production of the crude oxymethylene copolymer comprising recurring oxymethylene monomer units and oxyalkylene monomer units (which are derived from a cyclic ether or cyclic formal) inserted therein, due to the presence of a small amount of water in the raw materials for producing the crude oxymethylene copolymer. When the produced crude oxymethylene copolymer having the thermally unstable terminal hydroxymethyl groups is subjected to a post-treatment, for example, a heat treatment in the presence of an aqueous solution of an alkaline material (such as an aqueous solution of triethylamine), the unstable terminal groups (having terminal hydroxymethyl groups) of the copolymer chains are decomposed. This decomposition of the unstable terminal groups of the copolymer chains proceeds toward the inner portion of the main chain of of the copolymer comprising oxymethylene monomer units and oxyalkylene monomer units, and the decomposition terminates at a site where an oxyalkylene monomer unit is located, so that the oxyalkylene monomer unit at such a site is changed to a stable terminal group, such as hydroxyethyl group, hydroxybutyl group or the like. There is no particular limitation to the number of carbon atoms of the terminal hydroxyalkyl group, but in general, the terminal hydroxyalkyl group has at least 2 carbon atoms, and from the view point of the synthesis and purification of the cyclic ether or the cyclic formal which is used as a raw material comonomer, the terminal hydroxyalkyl group preferably has 2 to 10 carbon atoms. When an oxymethylene copolymer having terminal hydroxymethyl groups is subjected to molding, the hydroxymethyl groups are eliminated from the main chain of the copolymer due to the heat of the molding, to thereby generate formaldehyde. Therefore, when an oxymethylene copolymer contains a large amount of unstable terminal hydroxymethyl groups, the disadvantageous formation of formaldehyde vigorously occurs.

In the method of the present invention, with respect to the polymerization catalyst (such as boron trifluoride or a coordination compound thereof) remaining in the crude oxymethylene copolymer, the deactivation thereof may or may not be conducted prior to the heat treatment for stabilization of the unstable terminal groups. Needless to say, the method of the present invention can also be used for stabilizing an oxymethylene copolymer which has already been subjected to conventional stabilization treatment but still has unstable terminal groups (in the present invention, such a copolymer is also called a "crude oxymethylene copolymer").

In the present invention, when the deactivation of a polymerization catalyst is conducted prior to the heat treatment for stabilization of the unstable terminal groups, the deactivation can be conducted by a conventional method which comprises adding a crude oxymethylene copolymer to an aqueous or organic solvent solution of at least one catalyst deactivator (for example, ammonia; an amine, such as triethylamine or tri-n-butylamine; and a hydroxide, an inorganic acid salt or an organic acid salt of an alkali metal or an alkaline earth metal), thereby obtaining a slurry, and subsequently, agitating the obtained slurry for several minutes to several hours, to thereby neutralize and deactivate the catalyst. The resultant slurry is subjected to filtration and washing to thereby remove the unreacted monomers, the catalyst deactivator, salts formed by the neutralization of the catalyst and the like, followed by drying.

Further, in the method of the present invention, as apparent from the Examples described below, when the deactivation of a polymerization catalyst is conducted prior to the heat treatment for stabilization of the unstable terminal groups, the quaternary ammonium compound represented by formula (1) above may be used as a catalyst deactivator. In this case, the deactivation is conducted at a temperature generally employed for the deactivation of a polymerization catalyst which has been used for the production of an oxymethylene copolymer, i.e., a temperature in the range of room temperature to a temperature which is significantly lower than the below-described temperature employed for the heat treatment for stabilization of the unstable terminal groups. When the deactivation of the catalyst contained in the crude oxymethylene copolymer is conducted using the quaternary ammonium compound as a catalyst deactivator, as apparent from the Examples, the resultant crude oxymethylene copolymer (containing the quaternary ammonium compound) as such can be then subjected to heat treatment for decomposing the unstable terminal groups of the crude oxymethylene copolymer. In practice, a crude oxymethylene copolymer containing the quaternary ammonium compound in an amount sufficient for stabilizing the unstable terminal groups of the copolymer is first subjected to a relatively low temperature treatment to deactivate the polymerization catalyst, and is subsequently subjected to heat treatment at a relatively high temperature to stabilize the unstable terminal groups of the copolymer.

Further examples of the method for deactivating a polymerization catalyst include a method in which a crude oxymethylene copolymer is contacted with a vapor of a basic substance, such as ammonia or triethylamine, and a method in which a crude oxymethylene copolymer and at least one basic substance selected from the group consisting of hindered amines, triphenylphosphine and calcium hydroxide are mixed in a mixer.

Alternatively, in the method of the present invention, the crude oxymethylene copolymer containing a polymerization catalyst which has been used in the production of the crude oxymethylene copolymer may be subjected to treatment for reducing the amount of the polymerization catalyst contained therein by volatilizing the catalyst. Such a volatilization treatment can be conducted by heating a crude copolymer in an atmosphere of inert gas at a temperature equal to or below the melting point of the copolymer, thereby volatilizing a part of the polymerization catalyst from the copolymer. The resultant treated crude copolymer as such may be subjected to heat treatment for stabilization of the unstable terminal groups, or the treated crude copolymer may be subjected to treatment for deactivation of the polymerization catalyst prior to the heat treatment for stabilization of the unstable terminal groups.

If desired, prior to the above-mentioned deactivation or volatilization of the polymerization catalyst, the crude oxymethylene copolymer may be pulverized.

By the method of the present invention, a very stable oxymethylene copolymer having substantially no unstable terminal groups can be obtained from the thus obtained crude oxymethylene copolymer, or from a crude oxymethylene copolymer which has been subjected to conventional stabilization treatment, but still has unstable terminal groups. With respect to the quaternary ammonium compound used in the method of the present invention, there is no particular limitation as long as the compound is represented by formula (1) above. In formula (1), the term "acid residue" used in the definition of X means an anionic portion of the acid resulting from deprotonation. Examples of quaternary ammonium compounds include hydroxides of tetramethylammonium, tetraethylammonium, tetrapropylammonium, tetra-n-butylammonium, cetyltrimethylammonium, tetradecyltrimethylammonium, 1,6-hexamethylenebis(trimethylammonium), decamethylene-bis(trimethylammonium), trimethyl-3-chloro-2-hydroxy-propylammonium, trimethyl(2-hydroxyethyl)ammonium, triethyl(2-hydroxyethyl)ammonium, tripropyl(2-hydroxyethyl)ammonium, tri-n-butyl(2-hydroxyethyl)ammonium, trimethylbenzylammonium, triethylbenzylammonium, tripropylbenzylammonium, tri-n-butylbenzylammonium, trimethylphenylammonium, triethylphenylammonium, trimethyl-2-oxyethylammonium, monomethyltrihydroxyethylammonium, mondethyltrihydroxyethylammonium and octadecyltri(2-hydoxyethyl)ammonium; salts of hydroacids, such as hydrochloric acid, hydrobromic acid and hydrofluoric acid; salts of oxoacids, such as sulfuric acid, nitric acid, phosphoric acid, carbonic acid, boric acid, chloric acid, ionic acid, silicic acid, perchloric acid, chlorous acid, hypochlorous acid, chlorosulfuric acid, amidosulfuric acid, disulfuric acid and tripolyphosphoric acid; salts of thioacids, such as thiosulfuric acid; and salts of carboxylic acids, such as formic acid, acetic acid, propionic acid, butanoic acid, isobutanoic acid, pentanoic acid, caproic acid, caprylic acid, capric acid, benzoic acid and oxalic acid. Of the above quaternary ammonium compounds, the hydroxides are strongly alkaline compounds which require careful handling. Therefore, it is preferred that the hydroxides are used in the form of salts thereof, and it is especially preferred that the hydroxides are used in the form of carboxylic acid salts thereof.

In the method of the present invention, the quaternary ammonium compounds mentioned above may be used individually or in combination of two or more compounds.

The method of the present invention can be practiced using conventional apparatuses and operations. Further, in the method of the present invention, a quaternary ammonium compound can be used in combination with a substance conventionally used for stabilizing an oxymethylene copolymer, such as ammonia or an amine (e.g., triethylamine).

Hereinbelow, the method of the present invention is illustratively explained.

As representative examples of the modes for performing the heat treatment for stabilizing the unstable terminal groups of a crude oxymethylene copolymer according to the method of the present invention, there can be mentioned the following first and second modes. In the first mode, a crude oxymethylene copolymer in a molten state is subjected to heat treatment in the presence of a quaternary ammonium compound, thereby decomposing the unstable terminal groups of the copolymer. In the second mode, a crude oxymethylene copolymer in the form of a slurry, in which the crude oxymethylene copolymer is in a non-molten state, is subjected to heat treatment in the presence of a quaternary ammonium compound, thereby decomposing the unstable terminal groups of the copolymer.

First, an explanation is made below with respect to the heat treatment of a crude oxymethylene copolymer in a molten state (i.e., the first mode).

The crude oxymethylene copolymer in a molten state can be obtained by using, for example, a vented single screw type extruder or a vented twin screw type extruder. In the method of the present invention, the decomposition of unstable terminal groups of the crude oxymethylene copolymer is preferably performed at a temperature in the range of from the melting temperature of the oxymethylene copolymer to 260° C. When the temperature exceeds 260° C., there is a danger of the discoloration of the copolymer and the decomposition of the main chain (i.e., lowering of the molecular weight) of the copolymer.

In the first mode, the quaternary ammonium compound can be added to the crude oxymethylene copolymer either prior to or after the melting of the copolymer.

The quaternary ammonium compound is used in an amount of from 0.05 to 50 ppm by weight in terms of the amount of the nitrogen ascribed to the quaternary ammonium compound, relative to the total weight of the oxymethylene copolymer and the quaternary ammonium compound, wherein the amount of the nitrogen is represented by the following formula (2):

$$P \times 14/Q \tag{2}$$

wherein P represents the amount (ppm by weight) of the quaternary ammonium compound, relative to the total weight of the oxymethylene copolymer and the quaternary ammonium compound, 14 is the atomic weight of nitrogen, and Q represents the molecular weight of the quaternary ammonium compound.

When the quaternary ammonium compound is used in an amount smaller than 0.05 ppm by weight, the decomposition rate of unstable terminal groups lowers. When the quaternary ammonium compound is used in an amount greater than 50 ppm by weight, the color tone of the stabilized oxymethylene copolymer is likely to become poor.

As described above, in the present invention, the amount of the quaternary ammonium compound is expressed in terms of the amount of the nitrogen ascribed to the quaternary ammonium compound. Therefore, the molar amount of the quaternary ammonium compound, relative to the amount of an oxymethylene copolymer, would not vary depending on the molecular weight of the quaternary ammonium compound (which molecular weight varies depending on the type of the quaternary ammonium compound).

When the quaternary ammonium compound is added to the crude oxymethylene copolymer prior to the melting of the copolymer, the addition of the quaternary ammonium compound can be conducted by, for example, a method in which the quaternary ammonium compound is used in the form of a solution thereof in at least one solvent selected from the group consisting of water and an organic solvent capable of dissolving therein the quaternary ammonium compound, such as a lower aliphatic alcohol (e.g., methanol), and the solution of the quaternary ammonium compound is added to the copolymer in an amount of from 0.1 to 5% by weight, based on the weight of the crude oxymethylene copolymer, followed by mixing. The mixing can be conducted using a conventional mixer for solid substances, such as a horizontal cylinder mixer, a twin cylinder mixer, a ribbon mixer, a puddle-type mixer or a high speed fluid mixer. Alternatively, the solution of the quaternary ammonium compound can be fed to a chute of an extruder for the crude oxymethylene copolymer, or the solution of the quaternary ammonium compound can be fed directly to an extruder through a solution inlet of the extruder which is provided in the casing of the extruder at a portion close to a copolymer inlet for the crude oxymethylene copolymer so that the solution can be added to the crude oxymethylene copolymer which has not yet been melted.

As another method for adding the quaternary ammonium compound to the crude oxymethylene copolymer prior to the melting of the copolymer, there is a method in which the crude oxymethylene copolymer is mixed with a solution of the quaternary ammonium compound in at least one solvent selected from the group consisting of water and the above-mentioned organic solvent (e.g., a lower aliphatic alcohol, such as methanol) to thereby obtain a slurry, and the obtained slurry is subjected to filtration to obtain a filtration residue, followed by drying, thereby obtaining a crude oxymethylene copolymer containing the quaternary ammonium compound. In this method, it is preferred to use a solvent which is incapable of completely dissolving therein the oxymethylene copolymer. By the use of such a solvent, the filtration and drying process for recovering the copolymer can be conducted with ease. In this method, a desired amount of the quaternary ammonium compound can be added to the crude oxymethylene copolymer by controlling the quaternary ammonium compound concentration of the above-mentioned solution and the liquid content of the filtration residue (that is, the copolymer). The thus obtained crude oxymethylene copolymer containing a desired amount of the quaternary ammonium compound, as such or, if desired, after drying, is subjected to heat treatment by melting the crude oxymethylene copolymer in an extruder or the like. If desired, at least one conventional decomposition promoter, such as an amine, water or methanol, can be added to the copolymer which is in a molten state. When a decomposition promoter is used, it is preferred that an amount of the decomposition promoter (such as an amine, water, methanol or a mixture thereof) is in the range of from 0.1 to 5 parts by weight, based on 100 parts by weight of the oxymethylene copolymer (namely, in the range of 0.1 to 5% by weight, based on the weight of the copolymer. If desired, the quaternary ammonium compound can further be added to the molten copolymer as a decomposition promoter. The decomposition promoters which include an amine, water, methanol and a quaternary ammonium compound, can be used individually or in combination.

When the quaternary ammonium compound is added to the crude oxymethylene copolymer which is in a molten state, the addition of the quaternary ammonium compound can be conducted by, for example, a method in which a solution of the quaternary ammonium compound in at least one solvent selected from the group consisting of water and an organic solvent capable of dissolving therein the quaternary ammonium compound, such as a lower aliphatic alcohol (e.g., methanol), is added to the crude oxymethylene copolymer in a molten state, or a method in which the quaternary ammonium compound and at least one solvent selected from the group consisting of water and an organic solvent capable of dissolving therein the quaternary ammonium compound are separately added to the copolymer melted in an extruder or the like. It is preferred that the amount of water or the organic solvent (such as methanol) is in the range of from 0.1 to 5 parts by weight, based on 100 parts by weight of the crude oxymethylene copolymer (namely, 0.1 to 5% by weight, based on the weight of the copolymer). If desired, a conventional decomposition promoter, such as an amine, can be used together with the quaternary ammonium compound. In the method of the present invention, the decomposition rate of unstable terminal groups is very high, and therefore, a stable oxymethylene copolymer having substantially no unstable terminal groups can be obtained within a short period of time without repeating the heat treatment.

Next, an explanation is made below with respect to the heat treatment of a non-molten crude oxymethylene copolymer in the form of a slurry (i.e., second mode).

For example, the heat treatment of the second mode can be conducted by a method which comprises mixing a non-molten crude oxymethylene copolymer with a solution of the quaternary ammonium compound in a medium incapable of completely dissolving therein the oxymethylene copolymer to thereby obtain a slurry; and subjecting the obtained slurry to heat treatment to thereby decompose the unstable terminal groups of the crude oxymethylene copolymer.

In this method, as mentioned above, the use of a medium incapable of completely dissolving therein the oxymethylene copolymer simplifies the post treatment, such as filtration and drying.

Examples of a medium incapable of completely dissolving therein the oxymethylene copolymer include water and an aqueous methanol solution containing 10 to 30% by weight of methanol.

The heat treatment is performed at a temperature in the range of from 80° C. to lower than the melting temperature of the oxymethylene copolymer.

The concentration of the crude oxymethylene copolymer in the slurry (slurry concentration) is generally in the range of from 5 to 50% by weight. When the slurry concentration is less than 5% by weight, a large amount of a medium incapable of completely dissolving an dxymethylene copolymer is needed, and therefore, a large scale apparatus is needed for stabilizing the crude oxymethylene copolymer. When the slurry concentration is more than 50% by weight, agitation of the slurry becomes unsatisfactory, so that precipitation of oxymethylene copolymer occurs and, hence, the slurry separates into two phases.

In the second mode, the concentration of the quaternary ammonium compound in the medium incapable of completely dissolving therein the oxymethylene copolymer is in the range of from 0.05 to 500 ppm by weight, preferably 1 to 300 ppm by weight, in terms of the concentration of the nitrogen ascribed to the quaternary ammonium compound in the solution, wherein the concentration of the nitrogen is represented by the formula (2'):

$$P' \times 14/Q \qquad (2')$$

wherein P' represents the concentration (ppm by weight) of the quaternary ammonium compound in the solution, 14 is the atomic weight of nitrogen, and Q represents the molecular weight of the quaternary ammonium compound.

When the concentration of the quaternary ammonium compound is less than 0.05 ppm by weight, the decomposition rate of unstable terminal groups is likely to lower. When the concentration of the quaternary ammonium compound is more than 500 ppm by weight, the color tone of the stabilized copolymer is likely to become poor. As described above, in the present invention, the amount of the quaternary ammonium compound is expressed in terms of the amount of the nitrogen ascribed to the quaternary ammonium compound. Therefore, the molar amount of the quaternary ammonium compound, relative to the amount of an oxymethylene copolymer, would not vary depending on the molecular weight of the quaternary ammonium compound used (which molecular weight varies depending on the type of the quaternary ammonium compound). In the second mode, the quaternary ammonium compound can be used together with a conventional decomposition promoter, such as an amine.

In the above-explained method of the present invention for stabilizing the crude oxymethylene copolymer, the unstable terminal groups of the crude oxymethylene copolymer are decomposed at a high rate even at a low temperature, and therefore, it is possible to easily produce an excellent oxymethylene copolymer within a short period of time, which has substantially no unstable terminal groups and, therefore, is excellent with respect to both thermal stability and color tone. The term "short period of time" used above specifically means about 10 minutes or less when the stabilization is performed using a crude oxymethylene copolymer in a molten state, and about 1 hour or less when the stabilization is performed using a crude oxymethylene copolymer in a non-molten state.

In the present invention, when the stabilization is conducted with respect to the non-molten crude oxymethylene copolymer in the form of a slurry (i.e., the second mode), the resultant stabilized oxymethylene copolymer in which substantially all of the unstable terminal groups have been decomposed, is generally subjected to post treatments, namely, filtration and washing to remove formaldehyde (generated by the decomposition of the unstable terminal groups), unreacted monomers, and the quaternary ammonium compound used for stabilization, followed by drying. When the stabilization is conducted with respect to the crude oxymethylene copolymer in a molten state (i.e., the first mode), the above-mentioned impurities (i.e., formaldehyde, unreacted monomers, and the quaternary ammonium compound) are removed under reduced pressure from a vent of an extruder, and the resultant stabilized oxymethylene copolymer, in which substantially all of the unstable terminal groups have been decomposed, is pelletized.

In the method of the present invention, if desired, at least one conventional additive may be incorporated into the stabilized oxymethylene copolymer by means of an extruder or the like. Examples of such conventional additives include an antioxidant, a scavenger for formaldehyde, a scavenger for formic acid, an ultraviolet light absorber, a light stabilizer, a mold-release agent, a reinforcing material, an electroconductive material, a thermoplastic resin, a thermoplastic elastomer and a pigment. With respect to the timing for adding the additive to the copolymer, there is no particular limitation, and the timing may be appropriately chosen depending on the type of additive. For example, the additive can be added to either the crude oxymethylene copolymer prior to the decomposition of unstable terminal groups or the stabilized oxymethylene copolymer after the decomposition of unstable terminal groups.

In another aspect of the present invention, there is provided a stabilizer reagent for use in stabilizing an oxymethylene copolymer having thermally unstable terminal groups, mainly comprising at least one quaternary ammonium compound represented by the following formula (1):

$$[R^1R^2R^3R^4N^+]_n X^{-n} \qquad (1)$$

wherein:
  each of $R^1$, $R^2$, $R^3$ and $R^4$ independently represents an unsubstituted or substituted $C_1$–$C_{30}$ alkyl group, a $C_6$–$C_{20}$ aryl group, an aralkyl group which is an unsubstituted or substituted $C_1$–$C_{30}$ alkyl group substituted with at least one $C_6$–$C_{20}$ aryl group, or an alkylaryl group which is a $C_6$–$C_{20}$ aryl group substituted with at least one unsubstituted or substituted $C_1$–$C_{30}$ alkyl group, wherein the unsubstituted or substituted alkyl group is linear, branched or cyclic, and the substituted alkyl group has at least one substituent selected from the group consisting of a halogen atom, a hydroxyl group, an aldehyde group, a carboxyl group, an amino group and an amide group, and wherein at least one hydrogen atom of each of the unsubstituted alkyl group, the aryl group, the aralkyl group and the alkylaryl group is optionally replaced by a halogen atom;
  n represents an integer of from 1 to 3; and
  X represents a hydroxyl group; or an acid residue of a $C_1$–$C_{20}$ carboxylic acid, a hydroacid, an oxoacid, an inorganic thioacid or a $C_1$–$C_{20}$ organic thioacid.

Preferred examples of the stabilizer reagent of the present invention are as follows:
  (i) the stabilizer reagent as defined above, in which X in formula (1) above represents the acid residue of a carboxylic acid;
  (ii) the stabilizer reagent as defined above, in which the above-mentioned carboxylic acid is at least one acid selected from the group consisting of formic acid, acetic acid and propionic acid;

(iii) the stabilizer reagent as defined above, in which each of $R^1$, $R^2$, $R^3$ and $R^4$ in formula (1) above independently represents a $C_1$–$C_5$ alkyl group or a $C_2$–$C_4$ hydroxyalkyl; and (iv) the reagent as defined above, in which at least one of $R^1$, $R^2$, $R^3$ and $R^4$ in formula (1) above is a hydroxyethyl group.

The content of the quaternary ammonium compound in the stabilizer reagent of the present invention is preferably not less than 50% by weight, more preferably not less than 70% by weight, most preferably not less than 90% by weight.

Further, the stabilizer reagent of the present invention may be in any form, such as a powder, granules or a liquid.

With respect to the method for using the stabilizer reagent of the present invention, there is no particular limitation, and for example, the stabilizer reagent can be advantageously used in the above-mentioned two modes of the heat treatment according to the method of the present invention. That is, examples of methods in which the stabilizer reagent of the present invention can be advantageously used include a method in which a crude oxymethylene copolymer in a molten state is subjected to heat treatment in the presence of the stabilizer reagent of the present invention to thereby decompose the unstable terminal groups of the crude oxymethylene copolymer; and a method in which a non-molten crude oxymethylene copolymer in the form of a slurry is subjected to heat treatment in the presence of the stabilizer reagent of the present invention to thereby decompose the unstable terminal groups of the crude oxymethylene copolymer.

BEST MODE FOR CARRYING OUT THE INVENTION

Hereinbelow, the present invention will be described in more detail with reference to the following Examples and Comparative Examples, but they should not be construed as limiting the scope of the present invention.

The terms and measurement methods, which are used in the Examples and the Comparative Examples, are explained below.

<Unstable terminal group content of an oxymethylene copolymer (ppm)>

An oxymethylene copolymer is placed in a nitrogen atmosphere at 200° C. for 50 minutes, and during this period of time, formaldehyde generated from the oxymethylene copolymer is absorbed in water. Then, the amount of formaldehyde absorbed in the water is measured by titration. Almost all of the formaldehyde molecules generated under the above conditions are those generated by the decomposition of unstable terminal groups [—$(OCH_2)_n$—OH] of the oxymethylene copolymer. Therefore, the amount of formaldehyde absorbed in the water is used for calculating the amount of the unstable terminal groups on the oxymethylene copolymer.

<Color tone of a pellet>

The color tone of a pellet of an oxymethylene copolymer is evaluated by measuring the lightness (L value) and the yellowness (bL value) by means of a color-machine, MODEL ND-K (manufactured and sold by Nippon Denshyoku Co., Japan). The larger the "L" value and the smaller the "bL" value, the better the color tone of the pellet.

<% and ppm>

Unless otherwise specified, all percentage values and ppm values are by weight.

Further, an explanation is made below with respect to the methods for producing crude oxymethylene copolymers (A), (B) and (C) which were used in the Examples and Comparative Examples.

[Production of crude oxymethylene copolymers (A) and (B)]

A twin paddle-type continuous kneader having a jacket capable of circulating a heating medium therethrough was used. The internal temperature of the kneader was set at 80° C. and, then, 12 kg/hr of trioxane, 444 g/hr of 1,3-dioxolane (comonomer), and 7.1 g/hr of methylal (molecular weight modifier) were continuously fed into the kneader so that the amounts of 1,3-dioxolane and methylal in the kneader, respectively, became 0.045 mol and $0.7\times10^{-3}$ mol, per mol of the trioxane. Further, a 1% by weight solution of boron trifluoride di-n-butyletherate (polymerization catalyst) in cyclohexane was also continuously fed into the kneader at a rate of 39.6 g/hr so that the amount of boron trifluoride di-n-butyletherate in the kneader became $1.5\times10^{-5}$ mol per mol of the trioxane, to thereby perform a polymerization reaction. From the outlet of the kneader, the resultant oxymethylene copolymer was obtained [hereinafter, this oxymethylene copolymer is referred to as "crude oxymethylene copolymer (A)"]. Crude oxymethylene copolymer (A) was added to an aqueous 0.1% solution of triethylamine to thereby deactivate the catalyst. The resultant oxymethylene copolymer was filtered off and washed, followed by drying at 120° C., thereby obtaining crude oxymethylene copolymer (B). The obtained crude oxymethylene copolymer (B) had an unstable terminal group content of 5,300 ppm.

[Production of crude oxymethylene copolymer (C)]

A twin-paddle type continuous kneader having a jacket capable of circulating a heating medium therethrough was used. The internal temperature of the kneader was set at 80° C. and, then, 12 kg/hr of trioxane, 264 g/hr of ethylene oxide (comonomer), and 7.1 g/hr of methylal (molecular weight modifier) were continuously fed into the kneader so that the amounts of ethylene oxide and methylal in the kneader, respectively, became 0.045 mol and $0.7\times10^{-3}$ mol, per mol of the trioxane. Further, a 1% by weight solution of boron trifluoride di-n-butyletherate (polymerization catalyst) in cyclohexane was continuously fed into the kneader at a rate of 118.8 g/hr so that the amount of boron trifluoride di-n-butyletherate in the kneader became $4.5\times10^{-5}$ mol per mol of the trioxane, to thereby perform a polymerization reaction. The resultant oxymethylene copolymer obtained from the outlet of the kneader was added to an aqueous 0.1% solution of triethylamine to thereby deactivate the catalyst. The resultant oxymethylene copolymer was filtered off and washed, followed by drying at 120° C., thereby obtaining crude oxymethylene copolymer (C). The obtained crude oxymethylene copolymer (C) had an unstable terminal group content of 8,100 ppm.

EXAMPLES 1 to 25

Crude oxymethylene copolymer (A) was added to an aqueous 0.1% solution of triethylamine to thereby deactivate the polymerization catalyst contained in the copolymer. The resultant oxymethylene copolymer was filtered off and washed. Then, to the oxymethylene copolymer was added 1 part by weight [relative to 100 parts by weight of oxymethylene copolymer (A)] of an aqueous solution of a quaternary ammonium compound as a stabilizing reagent, and the mixture was mixed well, followed by drying at 120° C., thereby obtaining a crude oxymethylene copolymer containing a quaternary ammonium compound. The obtained crude oxymethylene copolymer had an unstable terminal group content of 5,000 ppm.

To the obtained crude oxymethylene copolymer containing a quaternary ammonium compound was added 0.3 part by weight [relative to 100 parts by weight of the crude copolymer] of 2,2'-methylenebis-(4-methyl-t-butylphenol) as an antioxidant, and the resultant mixture was fed into a twin-screw type vented extruder. (As shown in Table 1, in some of the Examples, water and/or triethylamine was added to the molten copolymer in the extruder.) In the extruder, the stabilization of the oxymethylene copolymer was conducted by decomposing the unstable terminal groups of the copolymer under conditions wherein the internal temperature of the extruder was 200° C., and the residence time was 5 minutes. Subsequently, in the extruder, the devolatilization of the stabilized oxymethylene copolymer is conducted through the vent (the degree of vacuum at the vent: 20 torr). Then, the stabilized oxymethylene copolymer was obtained in the form of a strand through the die of the extruder, and the obtained stabilized oxymethylene copolymer was pelletized.

Table 1 shows the type of the quaternary ammonium compound used; the amount of the quaternary ammonium compound used (in terms of the amount of the nitrogen ascribed to the quaternary ammonium compound), relative to the total weight of the oxymethylene copolymer and the quaternary ammonium compound; the amounts of the water used and the triethylamine used (each, % by weight, based on the weight of the crude oxymethylene copolymer); the unstable terminal group content of the stabilized oxymethylene copolymer; and the results of the evaluation of the color tone of the pellet.

EXAMPLES 26 to 50

To crude oxymethylene copolymer (A) was added 1 part by weight [relative to 100 parts by weight of oxymethylene copolymer (A)] of an aqueous quaternary ammonium compound solution or a solution of a quaternary ammonium compound in an aqueous 0.1% triethylamine solution to thereby deactivate the polymerization catalyst contained in the copolymer. The resultant was mixed well, followed by drying at 120° C., thereby obtaining a crude oxymethylene copolymer containing a quaternary ammonium compound. The obtained crude oxymethylene copolymer had an unstable terminal group content of 5,200 ppm.

To the obtained crude oxymethylene copolymer containing a quaternary ammonium compound was added 0.3 part by weight [relative to 100 parts by weight of the obtained crude copolymer] of 2,2'-methylenebis-(4-methyl-tert-butylphenol) as an antioxidant, and the resultant mixture was fed into a twin-screw type vented extruder. (As shown in Table 2, in some of the Examples, water and/or triethylamine was added to the molten copolymer in the extruder.) In the extruder, the stabilization of the oxymethylene copolymer was conducted by decomposing the unstable terminal groups of the copolymer under conditions wherein the internal temperature of the extruder was 200° C., and the residence time was 5 minutes (wherein the quaternary ammonium compound, which was originally added to the crude oxymethylene copolymer for deactivating the catalyst, was used as a stabilizing reagent). Subsequently, in the extruder, the devolatilization of the stabilized oxymethylene copolymer was conducted through the vent (the degree of vacuum at the vent: 20 torr). Then, the stabilized oxymethylene copolymer was obtained in the form of a strand through the die of the extruder, and the obtained stabilized oxymethylene copolymer was pelletized.

Table 2 shows the type of the quaternary ammonium compound used; the amount of the quaternary ammonium compound used (in terms of the amount of the nitrogen ascribed to the quaternary ammonium compound), relative to the total weight of the oxymethylene copolymer and the quaternary ammonium compound; the amounts of the water used and the triethylamine used (each, % by weight, based on the weight of the crude oxymethylene copolymer); the unstable terminal group content of the stabilized oxymethylene copolymer; and the results of the evaluation of the color tone of the pellet.

EXAMPLES 51 to 75

To crude oxymethylene copolymer (B) was added 1 part by weight [relative to 100 parts by weight of oxymethylene copolymer (B)] of an aqueous solution of a quaternary ammonium compound as a stabilizing reagent, and the resultant was mixed well to thereby obtain a crude oxymethylene copolymer containing a quaternary ammonium compound. In each of Examples 51 to 68, the obtained crude oxymethylene copolymer was dried at 120° C.

To the obtained crude oxymethylene copolymer containing a quaternary ammonium compound was added 0.3 part by weight [relative to 100 parts by weight of the obtained crude copolymer] of 2, 2'-methylenebis-(4-methyl-tert-butylphenol) as an antioxidant, and the resultant mixture was fed into a twin-screw type vented extruder. (As shown in Table 3, in some of the Examples, water and/or triethylamine was added to the molten copolymer in the extruder.) In the extruder, the stabilization of the crude oxymethylene copolymer was conducted by decomposing the unstable terminal groups of the copolymer under conditions wherein the internal temperature of the extruder was 200° C., and the residence time was 5 minutes. Subsequently, in the extruder, the devolatilization of the stabilized oxymethylene copolymer was conducted through the vent (the degree of vacuum at the vent: 20 torr). Then, the stabilized oxymethylene copolymer was obtained in the form of a strand through the die of the extruder, and the obtained stabilized oxymethylene copolymer was pelletized.

Table 3 shows the type of the quaternary ammonium compound used; the amount of the quaternary ammonium compound used (in terms of the amount of the nitrogen ascribed to the quaternary ammonium compound), relative to the total weight of the oxymethylene copolymer and the quaternary ammonium compound; the amounts of the water used and the triethylamine used (each, % by weight, based on the weight of the crude oxymethylene copolymer); the unstable terminal group content of the stabilized oxymethylene copolymer; and the results of the evaluation of the color tone of the pellet.

EXAMPLES 76 to 100

To crude oxymethylene copolymer (B) was added 0.3 part by weight [relative to 100 parts by weight of oxymethylene copolymer (B)] of 2,2'-methylenebis-(4-methyl-tert-butylphenol) as an antioxidant, and the resultant mixture was fed into a twin-screw type vented extruder having an internal temperature of 200° C. to thereby melt the mixture in the extruder. To the molten mixture in the extruder was added a quaternary ammonium compound as a stabilizing reagent and 3 parts by weight [relative to 100 parts by weight of the crude oxymethylene copolymer] of water. In the extruder, the stabilization of the oxymethylene copolymer was conducted by decomposing the unstable terminal groups of the copolymer under conditions wherein the internal temperature of the extruder was 200° C., and the residence time was 5 minutes. Subsequently, in the extruder, the devolatilization of the stabilized oxymethylene copolymer was conducted through the vent (the degree of vacuum at the vent: 20 torr). Then, the stabilized oxymethylene copolymer was obtained in the form of a strand through the die of the extruder, and the obtained stabilized oxymethylene copolymer was pelletized.

Table 4 shows the type of the quaternary ammonium compound used; the amount of the quaternary ammonium compound used (in terms of the amount of the nitrogen ascribed to the quaternary ammonium compound), relative to the total weight of the oxymethylene copolymer and the quaternary ammonium compound; the unstable terminal group content of the stabilized oxymethylene copolymer; and the results of the evaluation of the color tone of the pellet.

EXAMPLES 101 to 114

Crude oxymethylene copolymer (B) was added to a solution of a quaternary ammonium compound as a stabilizing agent in a mixture of water and methanol (water/methanol weight ratio: 80/20) [weight ratio of crude oxymethylene copolymer (B) to the quaternary ammonium compound solution: 1/3] to thereby obtain a slurry. The stabilization of the crude oxymethylene copolymer by decomposing the unstable terminal groups thereof was conducted by heating the obtained slurry at 120° C. for 30 minutes under pressure. The resultant slurry was filtered to obtain a filtration residue, and the filtration residue was washed and dried at 120° C., thereby obtaining a stabilized oxymethylene copolymer. To the obtained stabilized oxymethylene copolymer was added 0.3 part by weight (relative to 100 parts by weight of the stabilized oxymethylene copolymer) of 2,2'-methylenebis-(4-methyl-tert-butylphenol) as an antioxidant, and the resultant mixture was fed into a twin-screw type vented extruder. Then, the stabilized oxymethylene copolymer was obtained in the form of a strand through the die of the extruder, and the obtained stabilized oxymethylene copolymer was pelletized.

Table 5 shows the type of the quaternary ammonium compound used; the concentration of the quaternary ammonium compound (in terms of the amount of the nitrogen ascribed to the quaternary ammonium compound) in the solution thereof in the mixture of water and methanol (water/methanol weight ratio: 80/20); the unstable terminal group content of the stabilized oxymethylene copolymer; and the results of the evaluation of the color tone of the pellet.

EXAMPLES 115 to 130

Crude oxymethylene copolymer (A) was added to a solution of a quaternary ammonium compound as a stabilizing agent in an aqueous 0.1% triethylamine solution [weight ratio of crude oxymethylene copolymer (A) to the quaternary ammonium compound solution: 1/3] to thereby obtain a slurry in which the catalyst contained in the crude oxymethylene copolymer was deactivated by the triethylamine and the quaternary ammonium compound. The obtained slurry was filtered to obtain a filtration residue, and the filtration residue was dried at 120° C., thereby obtaining a crude oxymethylene copolymer containing a quaternary ammonium compound. The obtained crude oxymethylene compound had an unstable terminal group content of 5,200 ppm.

To the obtained crude oxymethylene copolymer containing a quaternary ammonium compound was added 0.3 part by weight (relative to 100 parts by weight of the crude copolymer) of 2,2'-methylenebis-(4-methyl-tert-butylphenol) as an antioxidant, and the resultant mixture was fed into a twin-screw type vented extruder. (As shown in Table 6, in some of the Examples, water and/or triethylamine was added to the molten copolymer in the extruder.) In the extruder, the stabilization of the crude oxymethylene copolymer was conducted by decomposing the unstable terminal groups of the copolymer under conditions wherein the internal temperature of the extruder was 200° C., and the residence time was 5 minutes (wherein the quaternary ammonium compound, which was originally used for deactivating the catalyst, was used as a stabilizing reagent). Subsequently, in the extruder, the devolatilization of the stabilized oxymethylene copolymer was conducted through the vent (the degree of vacuum at the vent: 20 torr). Then, the stabilized oxymethylene copolymer was obtained in the form of a strand through the die of the extruder, and the obtained stabilized oxymethylene copolymer was pelletized.

Table 6 shows the type of the quaternary ammonium compound used; the amount of the quaternary ammonium compound contained in the crude oxymethylene copolymer obtained after drying (in terms of the amount of the nitrogen ascribed to the quaternary ammonium compound), relative to the total weight of the oxymethylene copolymer and the quaternary ammonium compound; the amounts of the water used and the triethylamine used (each, % the weight, based on the weight of the crude oxymethylene copolymer); the unstable terminal group content of the stabilized oxymethylene copolymer; and the results of the evaluation of the color tone of the pellet.

EXAMPLES 131 to 136

Substantially the same procedure as in Examples 51 to 75 was repeated, except that crude oxymethylene copolymer (C) was used instead of crude oxymethylene copolymer (B).

Table 7 shows the type of the quaternary ammonium compound used; the amount of the quaternary ammonium compound used (in terms of the amount of the nitrogen ascribed to the quaternary ammonium compound), relative to the total weight of the oxymethylene copolymer and the quaternary ammonium compound; the amounts of the water and/or the triethylamine used (each, % by weight, based on the weight of the crude oxymethylene copolymer); the unstable terminal group content of the stabilized oxymethylene copolymer; and the results of the evaluation of the color tone of the pellet.

EXAMPLES 137 to 142

Substantially the same procedure as in Examples 76 to 100 was repeated, except that, instead of water together with a quaternary ammonium compound, an aqueous 2% triethylamine solution was added together with a quaternary ammonium compound to the molten copolymer in the extruder.

Table 8 shows the type of the quaternary ammonium compound used; the amount of the quaternary ammonium compound used (in terms of the amount of the nitrogen ascribed to the quaternary ammonium compound), relative to the total weight of the oxymethylene copolymer and the quaternary ammonium compound; the unstable terminal group content of the stabilized oxymethylene copolymer; and the results of the evaluation of the color tone of the pellet.

EXAMPLES 143 to 148

Substantially the same procedure as in Examples 137 to 142 was repeated, except that crude oxymethylene copolymer (C) was used instead of crude oxymethylene copolymer (B).

Table 9 shows the type of the quaternary ammonium compound used; the amount of the quaternary ammonium compound used (in terms of the amount of the nitrogen ascribed to the quaternary ammonium compound), relative to the total weight of the oxymethylene copolymer and the quaternary ammonium compound; the unstable terminal group content of the stabilized oxymethylene copolymer; and the results of the evaluation of the color tone of the pellet.

Comparative Examples 1 to 8

Substantially the same procedure as in Examples 76 to 100 was repeated, except that a substance other than a quaternary ammonium compound was used as a stabilizing reagent instead of the quaternary ammonium compound.

Table 10 shows the type of the stabilizing reagent; the amount of the stabilizing reagent in terms of part by weight per 100 parts of the oxymethylene copolymer (in the case where the stabilizing reagent is a nitrogen-containing compound, the amount of the stabilizing reagent is also shown in terms of the amount of the nitrogen ascribed to the nitrogen-containing compound as the stabilizing reagent, relative to the total weight of the oxymethylene copolymer and the stabilizing reagent); the unstable terminal group content of the stabilized oxymethylene copolymer; and the results of the evaluation of the color tone of the pellet.

Comparative Examples 9 to 14

Substantially the same procedure as in Examples 101 to 114 was repeated, except that a substance other than a quaternary ammonium compound was used as a stabilizing reagent instead of the quaternary ammonium compound.

Table 10 shows the type of the stabilizing reagent; the concentration of the stabilizing reagent in the solution thereof in the mixture of water and methanol (water/methanol weight ratio: 80/20) (in the case where the stabilizing reagent is a nitrogen-containing compound, the concentration of the stabilizing reagent is also shown in terms of the concentration of the nitrogen ascribed to the nitrogen-containing compound as the stabilizing reagent in the solution); the unstable terminal group content of the stabilized oxymethylene copolymer; and the results of the evaluation of the color tone of the pellet.

TABLE 1

| | Type of quaternary ammonium compound used: $[R^1R^2R^3R^4N^+]X^-$ | | | | | Amount of quaternary ammonium compound used (ppm in terms of nitrogen ascribed to the compound) | Amounts of water used/triethylamine used (% by wt.) | Unstable terminal group content of stabilized oxymethylene copolymer (ppm) | Color tone of pellet | |
|---|---|---|---|---|---|---|---|---|---|---|
| | $R^1$ | $R^2$ | $R^3$ | $R^4$ | X | | | | L value | bL value |
| Ex. 1 | $C_2H_5$ | $C_2H_5$ | $C_2H_5$ | $C_2H_5$ | OH | 0.5 | 3/0 | 43 | 86.7 | −1.9 |
| Ex. 2 | " | " | " | " | OH | 0.5 | 0/0 | 45 | 86.9 | −2.0 |
| Ex. 3 | " | " | " | " | OH | 10 | 3/0 | 20 | 86.0 | −1.7 |
| Ex. 4 | " | " | " | " | OCOH | 1 | 3/0 | 40 | 87.9 | −2.2 |
| Ex. 5 | " | " | " | " | OCOH | 10 | 3/0 | 24 | 87.2 | −2.1 |
| Ex. 6 | " | " | " | $C_2H_4OH$ | OH | 0.5 | 3/0 | 45 | 87.0 | −2.0 |
| Ex. 7 | " | " | " | " | OH | 10 | 3/0 | 26 | 86.4 | −1.8 |
| Ex. 8 | " | " | " | " | OCOH | 1 | 3/0 | 41 | 87.8 | −2.0 |
| Ex. 9 | " | " | " | " | OCOH | 10 | 3/0 | 23 | 87.5 | −1.9 |
| Ex. 10 | " | " | " | " | OCOH | 30 | 3/0 | 15 | 87.0 | −1.8 |
| Ex. 11 | " | " | " | " | OCOH | 10 | 0/0 | 29 | 87.6 | −2.2 |
| Ex. 12 | " | " | " | " | OCOH | 10 | 2/0.03 | 19 | 87.3 | −2.0 |
| Ex. 13 | " | " | " | " | $OCOCH_3$ | 10 | 3/0 | 22 | 87.4 | −2.0 |
| Ex. 14 | $CH_3$ | $CH_3$ | $CH_3$ | $CH_3$ | OH | 0.5 | 3/0 | 47 | 86.8 | −1.9 |
| Ex. 15 | " | " | " | " | OH | 10 | 3/0 | 23 | 86.4 | −1.8 |
| Ex. 16 | " | " | " | " | OCOH | 1 | 3/0 | 44 | 87.4 | −2.0 |
| Ex. 17 | " | " | " | " | OCOH | 1 | 0/0 | 43 | 87.5 | −2.1 |
| Ex. 18 | " | " | " | " | OCOH | 10 | 3/0 | 22 | 86.8 | −1.8 |
| Ex. 19 | " | " | " | $C_2H_4OH$ | OH | 0.5 | 3/0 | 45 | 86.9 | −1.9 |
| Ex. 20 | " | " | " | " | OH | 10 | 3/0 | 23 | 86.1 | −1.7 |
| Ex. 21 | " | " | " | " | OCOH | 1 | 3/0 | 39 | 87.5 | −2.0 |
| Ex. 22 | " | " | " | " | OCOH | 10 | 3/0 | 19 | 86.9 | −1.9 |
| Ex. 23 | " | " | " | " | OCOH | 10 | 0/0 | 20 | 87.3 | −2.0 |
| Ex. 24 | " | " | " | " | OCOH | 10 | 2/0.03 | 18 | 87.2 | −1.8 |
| Ex. 25 | " | " | " | " | OCOH | 20 | 3/0 | 14 | 86.9 | −1.7 |

TABLE 2

| | Type of quaternary ammonium compound used: $[R^1R^2R^3R^4N^+]X^-$ | | | | | Amount of quaternary ammonium compound used (ppm in terms of nitrogen ascribed to the compound) | Amounts of water used/triethylamine used (% by wt.) | Unstable terminal group content of stabilized oxymethylene copolymer (ppm) | Color tone of pellet | |
|---|---|---|---|---|---|---|---|---|---|---|
| | $R^1$ | $R^2$ | $R^3$ | $R^4$ | X | | | | L value | bL value |
| Ex. 26 | $C_2H_5$ | $C_2H_5$ | $C_2H_5$ | $C_2H_5$ | OH | 5 | 3/0 | 31 | 86.9 | −1.9 |
| Ex. 27 | " | " | " | " | OH | 10 | 3/0 | 23 | 86.8 | −1.8 |

TABLE 2-continued

| | Type of quaternary ammonium compound used: [R¹R²R³R⁴N⁺]X⁻ | | | | | Amount of quaternary ammonium compound used (ppm in terms of nitrogen ascribed to the compound) | Amounts of water used/tri-ethylamine used (% by wt.) | Unstable terminal group content of stabilized oxymethylene copolymer (ppm) | Color tone of pellet | |
|---|---|---|---|---|---|---|---|---|---|---|
| | R¹ | R² | R³ | R⁴ | X | | | | L value | bL value |
| Ex. 28 | " | " | " | " | OCOH | 5 | 3/0 | 32 | 87.2 | −2.1 |
| Ex. 29 | " | " | " | " | OCOH | 5 | 0/0 | 34 | 87.7 | −2.2 |
| Ex. 30 | " | " | " | " | OCOH | 20 | 3/0 | 12 | 87.0 | −2.0 |
| Ex. 31 | " | " | " | C₂H₄OH | OH | 5 | 3/0 | 33 | 86.8 | −1.9 |
| Ex. 32 | " | " | " | " | OH | 10 | 3/0 | 24 | 86.4 | −1.8 |
| Ex. 33 | " | " | " | " | OCOH | 5 | 3/0 | 35 | 87.3 | −2.2 |
| Ex. 34 | " | " | " | " | OCOH | 5 | 0/0 | 36 | 87.5 | −2.3 |
| Ex. 35 | " | " | " | " | OCOH | 5 | 2/0.03 | 31 | 87.1 | −2.1 |
| Ex. 36 | " | " | " | " | OCOH | 20 | 3/0 | 13 | 87.0 | −1.9 |
| Ex. 37 | CH₃ | CH₃ | CH₃ | CH₃ | OH | 5 | 3/0 | 32 | 86.5 | −1.8 |
| Ex. 38 | " | " | " | " | OH | 10 | 3/0 | 21 | 86.4 | −1.7 |
| Ex. 39 | " | " | " | " | OCOH | 5 | 3/0 | 36 | 87.4 | −2.0 |
| Ex. 40 | " | " | " | " | OCOH | 10 | 3/0 | 25 | 87.0 | −1.9 |
| Ex. 41 | " | " | " | C₂H₄OH | OH | 5 | 3/0 | 34 | 86.6 | −1.9 |
| Ex. 42 | " | " | " | " | OH | 10 | 3/0 | 23 | 86.4 | −1.8 |
| Ex. 43 | " | " | " | " | OCOH | 5 | 3/0 | 33 | 87.4 | −2.1 |
| Ex. 44 | " | " | " | " | OCOH | 10 | 3/0 | 19 | 87.2 | −2.0 |
| Ex. 45 | " | " | " | " | OCOH | 10 | 0/0 | 21 | 87.4 | −2.1 |
| Ex. 46 | C₂H₅ | C₂H₅ | C₂H₅ | C₂H₄OH | OCOH | 5 | 3/0 | 29 | 87.3 | −2.0 |
| Ex. 47 | " | " | " | " | OCOH | 5 | 0/0 | 30 | 87.6 | −2.1 |
| Ex. 48 | CH₃ | CH₃ | CH₃ | " | OCOH | 5 | 3/0 | 33 | 87.5 | −2.0 |
| Ex. 49 | " | " | " | " | OCOH | 5 | 2/0.03 | 28 | 87.2 | −1.9 |
| Ex. 50 | " | " | " | " | OCOCH₃ | 5 | 3/0 | 34 | 87.3 | −2.0 |

In each of Examples 26 to 45, 1 part by weight (relative to 100 parts by weight of the crude oxymethylene copolymer) of an aqueous quaternary ammonium compound solution was used. In each of Examples 46 to 50, 1 part by weight (relative to 100 parts by weight of the crude oxymethylene copolymer) of a solution of a quaternary ammonium compound in an aqueous 0.1% triethylamine solution was used.

TABLE 3

| | Type of quaternary ammonium compound used: [R¹R²R³R⁴N⁺]X⁻ | | | | | Amount of quaternary ammonium compound used (ppm in terms of nitrogen ascribed to the compound) | Amounts of water used/tri-ethylamine used (% by wt.) | Unstable terminal group content of stabilized oxymethylene copolymer (ppm) | Color tone of pellet | |
|---|---|---|---|---|---|---|---|---|---|---|
| | R¹ | R² | R³ | R⁴ | X | | | | L value | bL value |
| Ex. 51 | C₂H₅ | C₂H₅ | C₂H₅ | C₂H₅ | OH | 1 | 3/0 | 42 | 86.7 | −1.9 |
| Ex. 52 | " | " | " | " | OH | 10 | 3/0 | 25 | 86.0 | −1.7 |
| Ex. 53 | " | " | " | " | OCOH | 1 | 3/0 | 45 | 87.7 | −2.0 |
| Ex. 54 | " | " | " | " | OCOH | 20 | 3/0 | 14 | 87.2 | −1.9 |
| Ex. 55 | " | " | " | C₂H₄OH | OH | 1 | 3/0 | 39 | 86.9 | −1.9 |
| Ex. 56 | " | " | " | " | OH | 10 | 3/0 | 22 | 86.3 | −1.8 |
| Ex. 57 | " | " | " | " | OCOH | 1 | 3/0 | 41 | 87.9 | −2.2 |
| Ex. 58 | " | " | " | " | OCOH | 20 | 3/0 | 12 | 87.3 | −2.0 |
| Ex. 59 | " | " | " | " | OCOH | 20 | 0/0 | 14 | 87.4 | −2.0 |
| Ex. 60 | CH₃ | CH₃ | CH₃ | CH₃ | OH | 1 | 3/0 | 45 | 86.6 | −1.8 |
| Ex. 61 | " | " | " | " | OH | 10 | 3/0 | 29 | 86.1 | −1.6 |
| Ex. 62 | " | " | " | " | OCOH | 1 | 3/0 | 48 | 87.5 | −2.0 |
| Ex. 63 | " | " | " | " | OCOH | 20 | 3/0 | 16 | 87.0 | −1.9 |
| Ex. 64 | " | " | " | C₂H₄OH | OH | 1 | 3/0 | 43 | 86.9 | −1.9 |
| Ex. 65 | " | " | " | " | OH | 10 | 3/0 | 24 | 86.2 | −1.7 |
| Ex. 66 | " | " | " | " | OCOH | 1 | 3/0 | 44 | 87.8 | −2.2 |
| Ex. 67 | " | " | " | " | OCOH | 20 | 3/0 | 23 | 87.1 | −2.0 |
| Ex. 68 | " | " | " | " | OCOCH₃ | 20 | 3/0 | 28 | 87.3 | −1.9 |
| Ex. 69 | C₂H₅ | C₂H₅ | C₂H₅ | C₂H₄OH | OCOH | 10 | 0/0 | 26 | 87.2 | −2.0 |
| Ex. 70 | " | " | " | " | OCOH | 10 | 1/0 | 24 | 87.1 | −2.0 |
| Ex. 71 | " | " | " | " | OCOH | 20 | 0/0 | 17 | 86.9 | −1.9 |
| Ex. 72 | CH₃ | CH₃ | CH₃ | " | OCOH | 5 | 0/0 | 33 | 87.4 | −2.1 |
| Ex. 73 | " | " | " | " | OCOH | 10 | 0/0 | 28 | 87.2 | −2.0 |
| Ex. 74 | " | " | " | " | OCOH | 10 | 1/0 | 25 | 87.1 | −1.9 |
| Ex. 75 | " | " | " | " | OCOH | 10 | 0.5/0.02 | 24 | 87.0 | −1.9 |

In each of Examples 51 to 75, to the crude oxymethylene copolymer was added 1 part by weight (relative to 100 parts by weight of the oxymethylene copolymer) of an aqueous quaternary ammonium compound solution to thereby obtain a crude oxymethylene copolymer containing a quaternary ammonium compound. In each of Examples 51 to 68, the obtained crude copolymer was dried at 120° C. and subsequently, fed into an extruder, whereas, in each of Examples 69 to 75, the obtained crude copolymer as such was directly fed into an extruder.

TABLE 4

| | Type of quaternary ammonium compound used: [R¹R²R³R⁴N⁺]X⁻ | | | | | Amount of quaternary ammonium compound used (ppm in terms of nitrogen ascribed to the compound) | Unstable terminal group content of stabilized oxymethylene copolymer (ppm) | Color tone of pellet | |
|---|---|---|---|---|---|---|---|---|---|
| | R¹ | R² | R³ | R⁴ | X | | | L value | bL value |
| Ex. 76 | $C_2H_5$ | $C_2H_5$ | $C_2H_5$ | $C_2H_5$ | OH | 0.3 | 53 | 87.0 | −2.0 |
| Ex. 77 | " | " | " | " | " | 5 | 40 | 86.3 | −1.8 |
| Ex. 78 | " | " | " | " | OCOH | 0.3 | 52 | 87.5 | −2.2 |
| Ex. 79 | " | " | " | " | " | 10 | 31 | 87.2 | −2.0 |
| Ex. 80 | " | " | " | " | $OCOCH_3$ | 0.3 | 57 | 87.1 | −2.1 |
| Ex. 81 | " | " | " | $C_2H_4OH$ | OH | 0.3 | 59 | 86.9 | −1.9 |
| Ex. 82 | " | " | " | " | " | 5 | 42 | 86.5 | −1.8 |
| Ex. 83 | " | " | " | " | OCOH | 0.3 | 51 | 87.7 | −2.2 |
| Ex. 84 | " | " | " | " | " | 20 | 20 | 87.3 | −2.0 |
| Ex. 85 | " | " | " | " | $OCOCH_3$ | 0.3 | 56 | 87.4 | −2.1 |
| Ex. 86 | $CH_3$ | CH | $CH_3$ | $CH_3$ | OH | 0.3 | 54 | 86.9 | −1.9 |
| Ex. 87 | " | " | " | " | " | 5 | 43 | 86.3 | −1.7 |
| Ex. 88 | " | " | " | " | OCOH | 0.3 | 42 | 87.8 | −2.1 |
| Ex. 89 | " | " | " | " | " | 10 | 32 | 87.3 | −2.0 |
| Ex. 90 | " | " | " | " | $OCOCH_3$ | 0.3 | 57 | 87.4 | −2.0 |
| Ex. 91 | " | " | " | $C_2H_4OH$ | OH | 0.3 | 49 | 87.6 | −2.0 |
| Ex. 92 | " | " | " | " | " | 5 | 33 | 87.0 | −1.8 |
| Ex. 93 | " | " | " | " | OCOH | 0.3 | 58 | 87.8 | −2.2 |
| Ex. 94 | " | " | " | " | " | 10 | 29 | 87.2 | −2.1 |
| Ex. 95 | " | " | " | " | $OCOCH_3$ | 3 | 54 | 87.3 | −2.0 |
| Ex. 96 | $CH_3(CH_2)_2$ | $CH_3(CH_2)_2$ | $CH_3(CH_2)_2$ | $CH_3(CH_2)_2$ | OH | 3 | 44 | 87.5 | −1.9 |
| Ex. 97 | $CH_3(CH_2)_3$ | $CH_3(CH_2)_3$ | $CH_3(CH_2)_3$ | $CH_3(CH_2)_3$ | OH | 3 | 42 | 87.4 | −1.8 |
| Ex. 98 | $CH_3$ | $CH_3$ | $CH_3$ | $C_6H_5CH_2$ | OH | 1 | 49 | 86.8 | −1.8 |
| Ex. 99 | $C_2H_5$ | $C_2H_5$ | $C_2H_5$ | $C_6H_5CH_2$ | OH | 1 | 48 | 86.5 | −1.7 |
| Ex. 100 | $CH_3$ | $CH_3$ | $CH_3$ | $C_6H_5$ | OH | 1 | 50 | 86.7 | −1.9 |

TABLE 5

| | Type of quaternary ammonium compound used: [R¹R²R³R⁴N⁺]X⁻ | | | | | Amount of quaternary ammonium compound used (ppm in terms of nitrogen ascribed to the compound) | Unstable terminal group content of stabilized oxymethylene copolymer (ppm) | Color tone of pellet | |
|---|---|---|---|---|---|---|---|---|---|
| | R¹ | R² | R³ | R⁴ | X | | | L value | bL value |
| Ex. 101 | $C_2H_5$ | $C_2H_5$ | $C_2H_5$ | $C_2H_5$ | OH | 50 | 59 | 86.8 | −1.8 |
| Ex. 102 | " | " | " | " | OCOH | 50 | 60 | 87.0 | −1.9 |
| Ex. 103 | " | " | " | " | OCOH | 100 | 43 | 86.4 | −1.8 |
| Ex. 104 | " | " | " | $C_2H_4OH$ | OH | 50 | 54 | 86.4 | −1.8 |
| Ex. 105 | " | " | " | " | OCOH | 50 | 53 | 86.9 | −2.0 |
| Ex. 106 | " | " | " | " | OCOH | 100 | 40 | 86.5 | −1.8 |
| Ex. 107 | " | " | " | " | OCOH | 200 | 30 | 86.3 | −1.7 |
| Ex. 108 | " | " | " | " | $OCOCH_3$ | 50 | 55 | 86.8 | −1.8 |
| Ex. 109 | $CH_3$ | $CH_3$ | $CH_3$ | $CH_3$ | OH | 50 | 58 | 86.7 | −1.8 |
| Ex. 110 | " | " | " | " | OCOH | 50 | 52 | 86.9 | −1.9 |
| Ex. 111 | " | " | " | " | OCOH | 100 | 41 | 86.5 | −1.7 |
| Ex. 112 | " | " | " | $C_2H_4OH$ | OH | 50 | 60 | 86.8 | −1.8 |
| Ex. 113 | " | " | " | " | OCOH | 50 | 52 | 87.1 | −2.0 |
| Ex. 114 | " | " | " | " | OCOH | 100 | 38 | 86.9 | −1.8 |

TABLE 6

| | Type of quaternary ammonium compound used: $[R^1R^2R^3R^4N^+]X^-$ | | | | | Amount of quaternary ammonium compound used (ppm in terms of nitrogen ascribed to the compound) | Amounts of water used/tri-ethylamine used (% by wt.) | Unstable terminal group content of stabilized oxymethylene copolymer (ppm) | Color tone of pellet | |
|---|---|---|---|---|---|---|---|---|---|---|
| | $R^1$ | $R^2$ | $R^3$ | $R^4$ | X | | | | L value | bL value |
| Ex. 115 | $C_2H_5$ | $C_2H_5$ | $C_2H_5$ | $C_2H_5$ | OH | 1 | 3/0 | 41 | 86.7 | −1.9 |
| Ex. 116 | " | " | " | " | OH | 5 | 3/0 | 33 | 86.4 | −1.7 |
| Ex. 117-1 | " | " | " | " | OCOH | 1 | 3/0 | 39 | 87.5 | −2.0 |
| Ex. 117-2 | " | " | " | " | OCOH | 10 | 3/0 | 22 | 86.9 | −1.8 |
| Ex. 118-1 | " | " | " | $C_2H_4OH$ | OH | 1 | 3/0 | 38 | 86.8 | −1.8 |
| Ex. 118-2 | " | " | " | " | OH | 5 | 3/0 | 32 | 86.3 | −1.7 |
| Ex. 119 | " | " | " | " | OCOH | 1 | 3/0 | 42 | 87.7 | −2.2 |
| Ex. 120 | " | " | " | " | OCOH | 20 | 3/0 | 17 | 87.3 | −1.9 |
| Ex. 120 | " | " | " | " | OCOH | 20 | 0/0 | 18 | 87.4 | −1.8 |
| Ex. 121 | " | " | " | " | $OCOCH_3$ | 20 | 3/0 | 20 | 87.0 | −1.8 |
| Ex. 122 | $CH_3$ | $CH_3$ | $CH_3$ | $CH_3$ | OH | 1 | 3/0 | 40 | 86.9 | −1.8 |
| Ex. 123 | " | " | " | " | OH | 5 | 3/0 | 34 | 86.2 | −1.6 |
| Ex. 124 | " | " | " | " | OCOH | 1 | 3/0 | 41 | 87.3 | −2.0 |
| Ex. 125 | " | " | " | " | OCOH | 10 | 3/0 | 24 | 87.0 | −1.7 |
| Ex. 126 | " | " | " | $C_2H_4OH$ | OH | 1 | 3/0 | 39 | 86.8 | −1.8 |
| Ex. 127 | " | " | " | " | OH | 5 | 3/0 | 32 | 86.5 | −1.6 |
| Ex. 128 | " | " | " | " | OCOH | 1 | 3/0 | 40 | 87.9 | −2.2 |
| Ex. 129 | " | " | " | " | OCOH | 15 | 3/0 | 20 | 87.1 | −1.9 |
| Ex. 130 | " | " | " | " | OCOH | 15 | 1/0.02 | 19 | 87.3 | −1.8 |

TABLE 7

| | Type of quaternary ammonium compound used: $[R^1R^2R^3R^4N^+]X^-$ | | | | | Amount of quaternary ammonium compound used (ppm in terms of nitrogen ascribed to the compound) | Amounts of water used/tri-ethylamine used (% by wt.) | Unstable terminal group content of stabilized oxymethylene copolymer (ppm) | Color tone of pellet | |
|---|---|---|---|---|---|---|---|---|---|---|
| | $R^1$ | $R^2$ | $R^3$ | $R^4$ | X | | | | L value | bL value |
| Ex. 131 | $C_2H_5$ | $C_2H_5$ | $C_2H_5$ | $C_2H_4OH$ | OCOH | 30 | 3/0 | 53 | 87.0 | −1.9 |
| Ex. 132 | " | " | " | " | OCOH | 30 | 2/0.02 | 47 | 87.1 | −2.0 |
| Ex. 133 | " | " | " | " | OCOH | 30 | 0/0 | 49 | 86.9 | −1.8 |
| Ex. 134 | $CH_3$ | $CH_3$ | $CH_3$ | " | OCOH | 10 | 3/0 | 43 | 87.3 | −2.1 |
| Ex. 135 | " | " | " | " | OCOH | 10 | 2/0.02 | 48 | 87.0 | −2.0 |
| Ex. 136 | " | " | " | " | OCOH | 20 | 3/0 | 45 | 87.1 | −1.9 |

In each of Examples 131 to 136, to the crude oxymethylene copolymer was added 1 part by weight (relative to 100 parts by weight of the oxymethylene copolymer) of an aqueous quaternary ammonium compound solution to thereby obtain a crude oxymethylene copolymer containing a quaternary ammonium compound. In each of Examples 131 to 132, the obtained crude copolymer was dried at 120° C. and subsequently, fed into an extruder, whereas, in each of Examples 134 to 136, the obtained crude copolymer as such was directly fed into an extruder.

TABLE 8

| | Type of quaternary ammonium compound used: $[R^1R^2R^3R^4N^+]X^-$ | | | | | Amount of quaternary ammonium compound used (ppm in terms of nitrogen ascribed to the compound) | Unstable terminal group content of stabilized oxymethylene copolymer (ppm) | Color tone of pellet | |
|---|---|---|---|---|---|---|---|---|---|
| | $R^1$ | $R^2$ | $R^3$ | $R^4$ | X | | | L value | bL value |
| Ex. 137 | $C_2H_5$ | $C_2H_5$ | $C_2H_5$ | $C_2H_5$ | OCOH | 10 | 31 | 87.5 | −2.2 |
| Ex. 138 | " | " | " | $C_2H_4OH$ | " | 10 | 29 | 87.4 | −2.0 |
| Ex. 139 | " | " | " | " | OH | 10 | 35 | 86.5 | −1.8 |
| Ex. 140 | $CH_3$ | $CH_3$ | $CH_3$ | $CH_3$ | OCOH | 10 | 54 | 87.1 | −1.9 |
| Ex. 141 | " | " | " | $C_2H_4OH$ | " | 10 | 33 | 87.3 | −2.0 |
| Ex. 142 | " | " | " | " | " | 20 | 25 | 87.1 | −2.0 |

TABLE 9

| | Type of quaternary ammonium compound used: $[R^1R^2R^3R^4N^+]X^-$ | | | | | Amount of quaternary ammonium compound used (ppm in terms of nitrogen ascribed to the compound) | Unstable terminal group content of stabilized oxymethylene copolymer | Color tone of pellet | |
|---|---|---|---|---|---|---|---|---|---|
| | $R^1$ | $R^2$ | $R^3$ | $R^4$ | X | | (ppm) | L value | bL value |
| Ex. 143 | $C_2H_5$ | $C_2H_5$ | $C_2H_5$ | $C_2H_5$ | OCOH | 10 | 49 | 87.2 | −2.0 |
| Ex. 144 | " | " | " | $C_2H_4OH$ | " | 10 | 53 | 87.4 | −2.1 |
| Ex. 145 | " | " | " | " | OH | 10 | 44 | 86.5 | −1.8 |
| Ex. 146 | $CH_3$ | $CH_3$ | $CH_3$ | $CH_3$ | OCOH | 10 | 50 | 86.9 | −1.9 |
| Ex. 147 | " | " | " | $C_2H_4OH$ | " | 10 | 41 | 87.2 | −2.1 |
| Ex. 148 | " | " | " | " | " | 20 | 35 | 87.3 | −2.0 |

TABLE 10

| | Substance used as stabilizer reagent instead of quaternary ammonium compound | Amount of stabilizer reagent | (ppm in terms of nitrogen ascribed to the nitrogen-containing compound used as stabilizer reagent) | Unstable terminal group content of stabilized oxymethylene copolymer | Color tone of pellet | |
|---|---|---|---|---|---|---|
| | | (wt. %) | | (ppm) | L value | bL value |
| Comp. Ex. 1 | triethylamine | 0.03 | 41.5 | 1010 | 87.9 | −1.9 |
| Comp. Ex. 2 | " | 0.1 | 138.6 | 450 | 87.5 | −1.8 |
| Comp. Ex. 3 | " | 1.0 | 1386 | 150 | 86.9 | −1.7 |
| Comp. Ex. 4 | tri-n-butylamine | 0.05 | 37.8 | 1230 | 87.8 | −1.8 |
| Comp. Ex. 5 | " | 0.15 | 113.5 | 550 | 87.4 | −1.6 |
| Comp. Ex. 6 | " | 1.5 | 1135 | 160 | 87.0 | −1.4 |
| Comp. Ex. 7 | calcium hydroxide | 0.1 | — | 1350 | 80.1 | 1.4 |
| Comp. Ex. 8 | " | 1.0 | — | 220 | 76.3 | 2.2 |

TABLE 11

| | Substance used as stabilizer reagent instead of quaternary ammonium compound | Amount of stabilizer reagent used | (ppm in terms of nitrogen ascribed to the nitrogen-containing compound used as stabilizer reagent) | Unstable terminal group content of stabilized oxymethylene copolymer | Color tone of pellet | |
|---|---|---|---|---|---|---|
| | | (wt. %) | | (ppm) | L value | bL value |
| Comp. Ex. 9 | triethylamine | 1 | 1386 | 1350 | 83.5 | −1.0 |
| Comp. Ex. 10 | " | 5 | 6930 | 247 | 82.4 | −0.5 |
| Comp. Ex. 11 | " | 10 | 13861 | 176 | 80.3 | 0.8 |
| Comp. Ex. 12 | tri-n-butylamine | 2 | 1514 | 1410 | 83.1 | −0.6 |
| Comp. Ex. 13 | " | 8 | 6054 | 205 | 81.3 | 0.7 |
| Comp. Ex. 14 | " | 15 | 11351 | 148 | 79.7 | 1.2 |

IINDUSTRIAL APPLICABILITY

In the method of the present invention which comprises subjecting a crude oxymethylene copolymer to heat treatment in the presence of a specific quaternary ammonium compound, even by the addition of a very small amount of the quaternary ammonium compound, the decomposition rate of the unstable terminal groups of the crude oxymethylene copolymer can be remarkably increased, thereby facilitating the stabilization of the crude oxymethylene copolymer. Therefore, by the method of the present invention, it has become possible to easily produce an excellent oxymethylene copolymer within a short period of time, which has substantially no unstable terminal groups and, therefore, is excellent with respect to both thermal stability and color tone. Conventionally, the production of such an excellent oxymethylene copolymer having substantially no unstable terminal groups has been impossible. In addition, according to the method of the present invention, the heat treatment of the crude oxymethylene copolymer need not be repeated many times and can be conducted using a small scale apparatus. Such a method of the present invention is commercially advantageous, especially, for producing an oxymethylene copolymer which is used as a material for automobile parts, electronic parts, electrical parts, etc. Further, the stabilizer reagent of the present invention, when used in the heat treatment of a crude oxymethylene copolymer, can remarkably increase the decomposition rate of the unstable terminal groups of the crude oxymethylene copolymer, thereby facilitating the stabilization of the crude oxymethylene copolymer. Therefore, the stabilizing reagent of the present invention is very advantageous for stabilizing a crude oxymethylene copolymer.

What is claimed is:

1. A method for stabilizing an oxymethylene copolymer having thermally unstable terminal groups, which comprises subjecting an oxymethylene copolymer having thermally unstable terminal groups to heat treatment in the presence of at least one quaternary ammonium compound represented by the following formula (1):

$$[R^1R^2R^3R^4N^+]_nX^{-n} \tag{1}$$

wherein:
  each of $R^1$, $R^2$, $R^3$ and $R^4$ independently represents an unsubstituted or substituted $C_1$–$C_{30}$ alkyl group, a $C_6$–$C_{20}$ aryl group, an aralkyl group which is an unsubstituted or substituted $C_1$–$C_{30}$ alkyl group substituted with at least one $C_6$–$C_{20}$ aryl group, or an alkylaryl group which is a $C_6$–$C_{20}$ aryl group substituted with at least one unsubstituted or substituted $C_1$–$C_{30}$ alkyl group, wherein said unsubstituted or substituted alkyl group is linear, branched or cyclic, and said substituted alkyl group has at least one substituent selected from the group consisting of a halogen atom, a hydroxyl group, an aldehyde group, a carboxyl group, an amino group and an amide group, and wherein at least one hydrogen atom of each of said unsubstituted alkyl group, said aryl group, said aralkyl group and said alkylaryl group is optionally replaced by a halogen atom;
  n represents an integer of from 1 to 3; and
  X represents a hydroxyl group, or an acid residue of a $C_1$–$C_{20}$ carboxylic acid, a hydroacid, an oxoacid, an inorganic thioacid or a $C_1$–$C_{20}$ organic thioacid.

2. The method according to claim 1, wherein said heat treatment of the oxymethylene copolymer is performed at a temperature in the range of from the melting temperature of said oxymethylene copolymer to 260° C. wherein said oxymethylene copolymer is in a molten state.

3. The method according to claim 2, wherein said quaternary ammonium compound is added to the oxymethylene copolymer prior to melting said oxymethylene copolymer.

4. The method according to claim 2, wherein said quaternary ammonium compound is added to the oxymethylene copolymer after melting said oxymethylene copolymer.

5. The method according to claim 2, wherein said quaternary ammonium compound is used in an amount of from 0.05 to 50 ppm by weight in terms of the amount of the nitrogen ascribed to the quaternary ammonium compound, relative to the total weight of the oxymethylene copolymer and the quaternary ammonium compound, wherein the amount of the nitrogen is represented by the following formula (2):

$$P \times 14/Q \tag{2}$$

wherein P represents the amount (ppm by weight) of the quaternary ammonium compound, relative to the total weight of the oxymethylene copolymer and the quaternary ammonium compound, 14 is the atomic weight of nitrogen, and Q represents the molecular weight of the quaternary ammonium compound.

6. The method according to any one of claims 2 to 5, wherein said quaternary ammonium compound is used in the form of a solution of said quaternary ammonium compound in at least one solvent selected from the group consisting of water and an organic solvent capable of dissolving the quaternary ammonium compound.

7. The method according to claim 1, wherein said heat treatment of the oxymethylene copolymer is performed at a temperature in the range of from 80° C. to lower than the melting temperature of the oxymethylene copolymer and wherein said oxymethylene copolymer is in the form of a slurry obtained by mixing the oxymethylene copolymer in a non-molten state with a solution of said quaternary ammonium compound in a medium incapable of completely dissolving said oxymethylene copolymer.

8. The method according to claim 7, wherein the concentration of said quaternary ammonium compound in said solution is in the range of from 0.05 to 500 ppm by weight in terms of the concentration of the nitrogen ascribed to the quaternary ammonium compound in said solution, wherein the concentration of the nitrogen is represented by the formula (2'):

$$P' \times 14/Q \tag{2'}$$

wherein P' represents the concentration (ppm by weight) of the quaternary ammonium compound in said solution, 14 is the atomic weight of nitrogen, and Q represents the molecular weight of the quaternary ammonium compound.

9. The method according to claim 1, wherein said oxymethylene copolymer is obtained by copolymerizing formaldehyde or a cyclic acetal with at least one member selected from the group consisting of a cyclic ether and a cyclic formal in the presence of a polymerization catalyst.

10. The method according to claim 9, wherein said cyclic acetal is trioxane and said cyclic formal is 1,3-dioxolane.

11. The method according to claim 9, wherein said polymerization catalyst is a cation-active polymerization catalyst.

12. The method according to any one of claims 9 to 11, which further comprises deactivating said polymerization catalyst, wherein said heat treatment of the oxymethylene copolymer is performed after the deactivation of said polymerization catalyst.

13. The method according to any one of claims 9 to 11, wherein said heat treatment of the oxymethylene copolymer is performed without deactivating the polymerization catalyst.

14. The method according to claim 1, wherein X in the formula (1) represents the acid residue of a carboxylic acid.

15. The method according to claim 14, wherein said carboxylic acid is at least one acid selected from the group consisting of formic acid, acetic acid and propionic acid.

16. The method according to claim 1, wherein each of $R^1$, $R^2$, $R^3$ and $R^4$ in the formula (1) independently represents a $C_1$–$C_5$ alkyl group or a $C_2$–$C_4$ hydroxyalkyl.

17. The method according to claim 16, wherein at least one of said $R^1$, $R^2$, $R^3$ and $R^4$ in the formula (1) is a hydroxyethyl group.

18. A method for deactivating a polymerization catalyst present in an oxymethylene copolymer, which comprises treating an oxymethylene copolymer having thermally unstable terminal groups and containing a polymerization catalyst which has been used in the production of said oxymethylene copolymer with at least one quaternary ammonium compound represented by the following formula (1):

$$[R^1R^2R^3R^4N^+]_n X^{-n} \qquad (1)$$

wherein:

each of $R^1$, $R^2$, $R^3$ and $R^4$ independently represents an unsubstituted or substituted $C_1$–$C_{30}$ alkyl group, a $C_6$–$C_{20}$ aryl group, an arkallyl group which is an unsubstituted or substituted $C_1$–$C_{30}$ alkyl group substituted with at least one $C_6$–$C_{20}$ aryl group, or an alkylaryl group which is a $C_6$–$C_{20}$ aryl group substituted with at least one unsubstituted or substituted $C_1$–$C_{30}$ alkyl group, wherein said unsubstituted or substituted alkyl group is linear, branched or cyclic, and said substituted alkyl group has at least one substituent selected from the group consisting of a halogen atom, a hydroxyl group, an aldehyde group, a carboxyl group, an amino group and an amide group, and wherein at least one hydrogen atom of each of said unsubstituted alkyl group, said aryl group, said aralkyl group and said alkylaryl group is optionally replaced by a halogen atom;

n represents an integer of from 1 to 3; and x represents a hydroxyl group, or an acid residue of a $C_1$–$C_{20}$ carboxylic acid, a hydroacid, an oxoacid, an inorganic thioacid or a $C_1$–$C_{20}$ organic thioacid.

19. The method according to claim 18, wherein said quaternary ammonium compound is used in an amount of from 0.05 to 50 ppm by weight in terms of the amount of nitrogen ascribed to the quaternary ammonium compound, relative to the total weight of the oxymethylene copolymer and the quaternary ammonium compound, wherein the amount of the nitrogen is represented by the following formula (2"):

$$P'' \times 14/Q \qquad (2'')$$

wherein P" represents the amount (ppm by weight) of the quaternary ammonium compound, relative to the total weight of the oxymethylene copolymer and the quaternary ammonium compound, 14 is the atomic weight of nitrogen, and Q represents the molecular weight of the quaternary ammonium compound.

20. A method for stabilizing an oxymethylene copolymer having thermally unstable terminal groups and containing a polymerization catalyst, which comprises:

(i) treating an oxymethylene copolymer having thermally unstable terminal groups and containing a polymerization catalyst which has been used in the production of said oxymethylene copolymer with at least one quaternary ammonium compound represented by the following formula (1):

$$[R^1R^2R^3R^4N^+]_n X^{-n} \qquad (1)$$

wherein:

each of $R^1$, $R^2$, $R^3$ and $R^4$ independently represents an unsubstituted or substituted $C_1$–$C_{30}$ alkyl group, a $C_6$–$C_{20}$ aryl group, an aralkyl group which is an unsubstituted or substituted $C_1$–$C_{30}$ alkyl group substituted with at least one $C_6$–$C_{20}$ aryl group, or an alkylryl group which is a $C_6$–$C_{20}$ aryl group substituted with at least one unsubstituted or substituted $C_1$–$C_{30}$ alkyl group, wherein said unsubstituted or substituted alkyl group is linear, branched or cyclic, and said substituted alkyl group has at least one substituent selected from the group consisting of a halogen atom, a hydroxyl group, an aldehyde group, a carboxyl group, an amino group and an amide group, and wherein at least one hydrogen atom of each of said unsubstituted alkyl group, said aryl group, said aralkyl group and said alkylaryl group is optionally replaced by a halogen atom;

n represents an integer of from 1 to 3; and x represents a hydroxyl group, or an acid residue of a $C_1$–$C_{20}$ carboxylic acid, a hydroacid, an oxoacid, an inorganic thioacid or a $C_1$–$C_{20}$ organic thioacid, to thereby deactivate said polymerization catalyst, thereby obtaining a quaternary ammonium compound-containing oxymethylene copolymer having thermally unstable terminal groups, and (ii) subjecting said quaternary ammonium compound-containing oxymethylene copolymer obtained in said step (i) to heat treatment, thereby causing said quaternary ammonium compound to decompose said thermally unstable terminal groups of the oxymethylene copolymer.

21. A polymerization catalyst-deactivated oxymethylene copolymer composition, obtained by the method of claim 18 or 19, comprising an oxymethylene copolymer having thermally unstable terminal groups and at least one quaternary ammonium compound represented by the following formula (1):

$$[R^1R^2R^3R^4N^+]_n X^{-n} \qquad (1)$$

wherein:

each of $R^1$, $R^2$, $R^3$ and $R^4$ independently represents an unsubstituted or substituted $C_1$–$C_{30}$ alkyl group, a $C_6$–$C_{20}$ aryl group, an aralkyl group which is an unsubstituted or substituted $C_1$–$C_{30}$ alkyl group substituted with at least one $C_6$–$C_{20}$ aryl group, or an alkylaryl group which is a $C_6$–$C_{20}$ aryl group substituted with at least one unsubstituted or substituted $C_1$–$C_{30}$ alkyl group, wherein said unsubstituted or substituted alkyl group is linear, branched or cyclic, and said substituted alkyl group has at least one substituent selected from the group consisting of a halogen atom, a hydroxyl group, an aldehyde group, a carboxyl group, an amino group and an amide group, and wherein at least one hydrogen atom of each of said unsubstituted alkyl group, said aryl group, said aralkyl group and said alkylaryl group is optionally replaced by a halogen atom;

n represents an integer of from 1 to 3; and

X represents a hydroxyl group, or an acid residue of a $C_1$–$C_{20}$ carboxylic acid, a hydroacid, an oxoacid, an inorganic thioacid or a $C_1$–$C_{20}$ organic thioacid.

22. The composition according to claim 21, which further comprises at least one additive selected from the group consisting of an antioxidant, a scavenger for formaldehyde, a scavenger for formic acid, an ultraviolet light absorber, a light stabilizer, a mold-release agent, a reinforcing material, an electroconductive material, a thermoplastic resin, a thermoplastic elastomer and a pigment.

* * * * *